United States Patent
Lippard et al.

(10) Patent No.: US 10,662,210 B2
(45) Date of Patent: May 26, 2020

(54) COMPOSITIONS AND METHODS COMPRISING OSMIUM FOR THE TREATMENT OF CANCERS

(71) Applicant: Massachusetts Institute of Technology, Cambridge, MA (US)

(72) Inventors: Stephen J. Lippard, Washington, DC (US); Kogularamanan Suntharalingam, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/365,561

(22) Filed: Mar. 26, 2019

(65) Prior Publication Data

US 2019/0276484 A1    Sep. 12, 2019

Related U.S. Application Data

(63) Continuation of application No. 15/323,149, filed as application No. PCT/US2015/038741 on Jul. 1, 2015, now abandoned.

(60) Provisional application No. 62/019,540, filed on Jul. 1, 2014.

(51) Int. Cl.
C07F 15/00    (2006.01)

(52) U.S. Cl.
CPC ................. *C07F 15/0026* (2013.01)

(58) Field of Classification Search
CPC .................................................. C07F 15/0026
See application file for complete search history.

(56) References Cited

U.S. PATENT DOCUMENTS

| | | | |
|---|---|---|---|
| 4,577,042 | A | 3/1986 | Collins et al. |
| 4,683,315 | A | 7/1987 | Lippard et al. |
| 8,729,286 | B2 | 5/2014 | Lippard et al. |
| 9,034,862 | B2 | 5/2015 | Lippard et al. |
| 9,133,225 | B2 | 9/2015 | Lippard et al. |
| 9,265,747 | B2 | 2/2016 | Lippard et al. |
| 9,593,139 | B2 | 3/2017 | Lippard et al. |
| 2003/0105306 | A1 | 6/2003 | Grubbs et al. |
| 2008/0300367 | A1 | 12/2008 | Patil et al. |
| 2011/0230456 | A1 | 9/2011 | Lau et al. |
| 2011/0257261 | A1 | 10/2011 | Lippard et al. |
| 2015/0299233 | A1 | 10/2015 | Lippard et al. |
| 2017/0129911 | A1 | 5/2017 | Lippard et al. |
| 2017/0233422 | A1 | 8/2017 | Lippard et al. |

OTHER PUBLICATIONS

International Search Report and Written Opinion for PCT/US2015/038741 dated Sep. 15, 2015.
International Preliminary Report on Patentability for PCT/US2015/038741 dated Jan. 12, 2017.
Chin et al., Luminescent nitridometal complexes. Photophysical and photochemical properties of the $3[(d_{xy})^1(d_{x*})^1]$ excited state of nitridoosmium(VI) complexes with polypyridine ligands. J Chem Soc Dalton Trans. 1995;0:657-63.
Clarke et al., Non-platinum chemotherapeutic metallopharmaceuticals. Chem Rev. Sep. 8, 1999;99(9):2511-34.
Donahue et al., Characterization of a DNA damage-recognition protein from mammalian cells that binds specifically to intrastrand d(GpG) and d(ApG) DNA adducts of the anticancer drug cisplatin. Biochemistry. Jun. 1990; 29(24):5872-80.
Fricker, Metal based drugs: from serendipity to design. Dalton Trans. Nov. 21, 2007;43:4903-17. Epub Sep. 19, 2007.
Fu et al., Organometallic Osmium Arene Complexes with Potent Cancer Cell Cytotoxicity. J. Med. Chem. 2010;53(22):8192-6. Epub Oct. 26, 2010.
Griffith et al., Metal nitrido- and oxo-complexes. Part I. Complexes of ruthenium and osmium. J Chem Soc Dalton Trans. 1973;0:1315-20.
Huynh et al., Formation and reactivity of the Os(IV)-Azidoimido complex, PPN[OsIV(bpy)(C1)3(N4). J Am Chem Soc. 2002;124(17):4580-2. Epub Apr. 5, 2002.
Guo et al., Metals in Medicine. Angew Chem Int Ed. 1999;38:1512-31.
Jakupec et al, Antitumour metal compounds: more than theme and variations. Dalton Trans. Jan. 14, 2008;2:183-94. Epub Nov. 7, 2007.
Jamieson et al., Structure, Recognition, and Processing of Cisplatin-DNA Adducts. Chem. Rev. 1999;99(9):2467-98. Epub Aug. 14, 1999.
Lippard, Osmium(VI) Nitrido Complexes as Anti-Cancer Agents. The Royal Society, London. May 13-14, 2014. Presentation.
Ni et al., Osmium(VI) complexes as a new class of potential anti-cancer agents. Chem. Commun. 2011;47:2140-2. Epub Jan. 4, 2011.
Ni et al., Osmium(VI) nitrido complexes bearing azole heterocycles: a new class of antitumor agents. Chem. Sci. 2012;3:1582-8. Epub Feb. 3, 2012.
Peacock et al., Tuning the Hydrolytic Aqueous Chemistry of Osmium Arene Complexes with N,O-Chelating Ligands to Achieve Cancer Cell Cytotoxicity. J. Am. Chem. Soc. 2007;129(11):3348-57. Epub Feb. 24, 2007.
Shnyder et al., Anti-colorectal cancer activity of an organometallic osmium arene azopyridine complex. Med. Chem. Commun. 2011;2:666-8. Epub May 19, 2011.
Suntharalgam et al., Bidentate ligands on osmium(VI) nitrido complexes control intracellular targeting and cell death pathways. J Am Chem Soc. Sep. 25, 2013;135(38):14060-3. doi: 10.1021/ja4075375.
Suntharalgam et al., Bidentate ligands on osmium(VI) nitrido complexes control intracellular targeting and cell death pathways. J Am Chem Soc. Sep. 25, 2013;135(38):14060-3. doi: 10.1021/ja4075375. Epub Sep. 16, 2013. Supporting Information. 34 pages.

(Continued)

*Primary Examiner* — Joseph R Kosack
(74) *Attorney, Agent, or Firm* — Wolf, Greenfield & Sacks, P.C.

(57) ABSTRACT

Compositions and methods comprising osmium are provided. In some embodiments, the osmium compounds comprise a bidentate ligand. In some embodiments, the osmium compounds are used in method for treating cancer.

16 Claims, 13 Drawing Sheets
Specification includes a Sequence Listing.

(56) References Cited

OTHER PUBLICATIONS

Tang et al., Synthesis and antitumor activity of a series of osmium(VI) nitrido complexes bearing quinolinolato ligands. Chem Commun (Camb). Nov. 4, 2013;49(85):9980-2. doi: 10.1039/c3cc42250j.
Van Rijt et al., Current applications and future potential for bioinorganic chemistry in the development of anticancer drugs. Drug Discovery Today. Dec. 2009;14(23-24):1089-97. Epub Sep. 24, 2009.
Van Rut et al., Cytotoxicity, Hydrophobicity, Uptake, and Distribution of Osmium(II) Anticancer Complexes in Ovarian Cancer Cells. J. Med. Chem. 2010;53(2):840-9. Epub Dec. 12, 2009.
Wang et al., Cellular processing of platinum anticancer drugs. Nat Rev Drug Discov. Apr. 2005;4(4):307-20. Review.
Wright et al., Studies on transition-metal nitrido and oxo complexes. Part VII(1). Substituted nitrido complexes of osmium and ruthenium. Trans Met Chem. 1982;7(1):53-8.

SEQUENCE LISTING

```
<160> NUMBER OF SEQ ID NOS: 3

<210> SEQ ID NO 1
<211> LENGTH: 29
<212> TYPE: PRT
<213> ORGANISM: Artificial Sequence
<220> FEATURE:
<223> OTHER INFORMATION: Synthetic Polypeptide

<400> SEQUENCE: 1

Met Asp Pro Val Val Val Leu Gly Leu Cys Leu Ser Cys Leu Leu Leu
1               5                   10                  15

Leu Ser Leu Trp Lys Gln Ser Tyr Gly Gly Gly Lys Leu
            20                  25

<210> SEQ ID NO 2
<211> LENGTH: 12
<212> TYPE: PRT
<213> ORGANISM: Artificial Sequence
<220> FEATURE:
<223> OTHER INFORMATION: Synthetic Polypeptide

<400> SEQUENCE: 2

Arg Arg Phe Lys Glu Gly Gly Arg Gly Gly Lys Tyr
1               5                   10

<210> SEQ ID NO 3
<211> LENGTH: 11
<212> TYPE: PRT
```

```
<213> ORGANISM: Artificial Sequence
<220> FEATURE:
<223> OTHER INFORMATION: Synthetic Polypeptide

<400> SEQUENCE: 3

Arg Arg Tyr Leu Glu Asn Gly Lys Glu Thr Leu
1               5                   10
```

COMPOSITIONS AND METHODS COMPRISING OSMIUM FOR THE TREATMENT OF CANCERS

RELATED APPLICATIONS

This application is a continuation of U.S. patent application Ser. No. 15/323,149, filed Dec. 30, 2016, entitled "Compositions and Methods Comprising Osmium for the Treatment of Cancers", which is is a national stage application under 35 U.S.C. § 371 of International Patent Application Serial No. PCT/US2015/038741, filed on Jul. 1, 2015, entitled "Compositions and Methods Comprising Osmium for the Treatment of Cancers," which claims the benefit of U.S. Provisional Patent Application Ser. No. 62/019,540, filed Jul. 1, 2014, entitled "Compositions and Methods Comprising Osmium for the Treatment of Cancers," each of which are incorporated herein by reference in their entirety.

STATEMENT REGARDING FEDERALLY SPONSORED RESEARCH OR DEVELOPMENT

This invention was made with Government support under Grant No. R01 CA034992 awarded by the National Institutes of Health. The Government has certain rights in the invention.

TECHNICAL FIELD

Compositions and methods comprising osmium are provided. In some embodiments, the osmium compounds comprise a bidentate ligand. In some embodiments, the osmium compounds are used in methods for treating cancer.

BACKGROUND

Platinum-based drugs are among the most active and widely used anticancer agents. Although platinum-based cancer chemotherapeutics are effective against a number of solid tumors, especially testicular and ovarian cancer, the clinical use of certain platinum-based cancer chemotherapeutics has been limited because of their toxic effects as well as the intrinsic and acquired resistance of some tumors to certain platinum-based cancer chemotherapeutics drug. Drawbacks associated with platinum therapy, such as acquired or inherent resistance, toxic side effects, and tumor recurrence after initial treatment, have prompted researchers to investigate alternative transition metal-based anticancer drugs.

Accordingly, improved compositions and methods are needed.

SUMMARY

The present invention provides compounds, compositions, preparations, formulations, kits, and methods useful for treating subjects having proliferative diseases or at risk of developing cancer. More specifically, the present invention relates to compounds, compositions, kits, and methods for treatment of cancers using an osmium compound comprising a bidentate ligand. The subject matter of the present invention involves, in some cases, interrelated products, alternative solutions to a particular problem, and/or a plurality of different uses of one or more systems and/or articles.

In one aspect, compounds are provided. In one set of embodiment, a compound comprises Formula I:

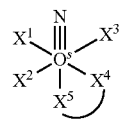

wherein:

is a bidentate ligand, wherein $X^4$ and $X^5$ are the same or different and are selected from the group consisting of N, O, S, and P;

$X^1$, $X^2$, and $X^3$ are the same or different and are selected from the group consisting of halo, —CN, —OR', —OCN, —SeCN, —SR', —SCN, —OCOR', —OSO$_2$, and —OPO$_{-3}$R'$_2$; and each R' is independently hydrogen, optionally substituted alkyl, optionally substituted heteroalkyl, optionally substituted aryl, or optionally substituted heteroaryl.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

DETAILED DESCRIPTION

Figure 1:
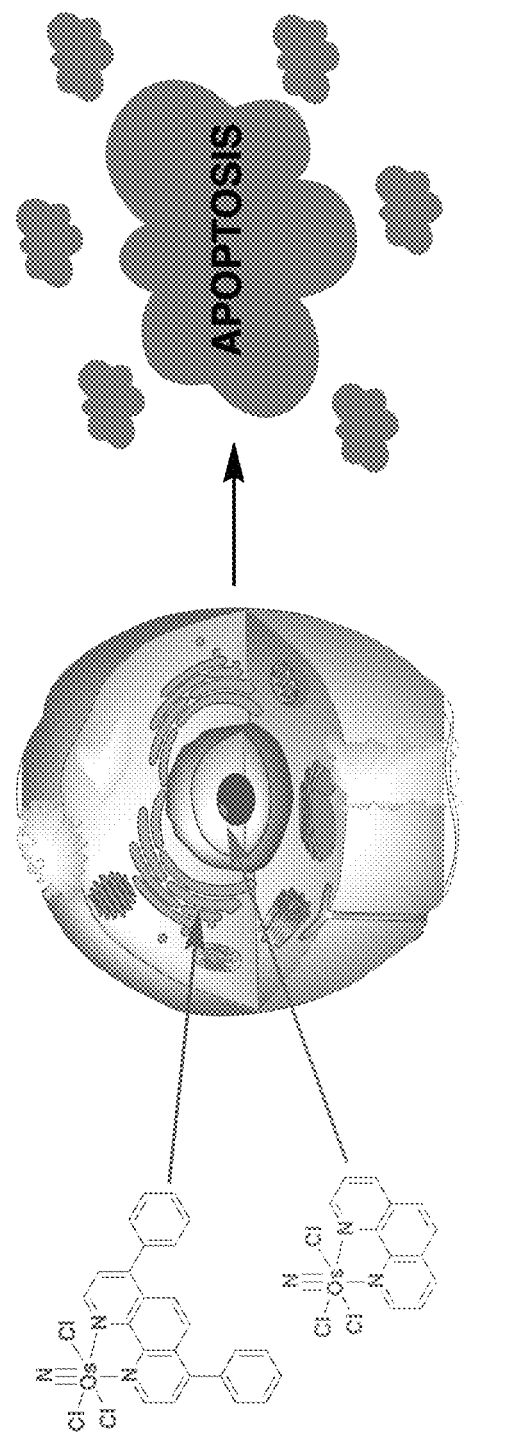
FIG. 1 shows a schematic of the mechanism of action for two different osmium compounds of Formula (I), according to some embodiments.

Compositions and methods comprising osmium are provided. In some embodiments, an osmium compound comprises a bidentate ligand. In some embodiments, the osmium compounds are used in methods for treating cancer. In some aspects, the disclosure provides compounds and related compositions for use in treating subjects known to have (e.g., diagnosed with) cancer or subjects at risk of developing cancer. In some embodiments, methods of the invention include administering to a subject a therapeutically effective amount of a compound, or a therapeutic preparation, composition, or formulation of the compound as described herein, to a subject having or suspected of having a cancer. The subject matter of the present invention involves, in some cases, interrelated products, alternative solutions to a particular problem, and/or a plurality of different uses of one or more systems and/or articles.

In some embodiments, an osmium compound comprises a nitrido ligand (e.g., osmium-nitrodo compounds). In some embodiments, an osmium-nitrido compound is associated with a bidentate ligand, and one or more other ligands. As will be known to those of ordinary skill in the art, a bidentate ligand, when bound to a metal center, forms a metallacycle structure with the metal center, also known as a chelate ring. Bidentate ligands suitable for use in the present invention include species that have at least two sites capable of binding to a metal center. For example, the bidentate ligand may comprise at least two heteroatoms that coordinate the metal center, or a heteroatom and an anionic carbon atom that coordinate the metal center. Examples of bidentate ligands suitable for use in the invention include, but are not limited to, alkyl and aryl derivatives of moieties such as amines, phosphines, phosphites, phosphates, imines, oximes, ethers, thiolates, thioethers, hybrids thereof, substituted derivatives thereof, aryl groups (e.g., bis-aryl, heteroaryl-substituted aryl), heteroaryl groups, and the like. Specific examples of bidentate ligands include ethylenediamine, 2,2'-bipyridine, acetylacetonate, oxalate, and the like. Other non-limiting examples of bidentate ligands include diimines, pyridylimines, diamines, imineamines, iminethioether, iminephosphines, bisoxazoline, bisphosphineimines, diphosphines, phosphineamine, salen and other alkoxy imine ligands, amidoamines, imidothioether fragments and alkoxyamide fragments, and combinations of the above ligands.

In some embodiments, an osmium compound comprises Formula (I):

(I)

wherein:

is a bidentate ligand and $X^4$ and $X^5$ are the same or different and are selected from the group consisting of N, O, S, and P;

$X^1$, $X^2$, and $X^3$ are the same or different and are selected from the group consisting of optionally substituted alkyl, optionally substituted heteroalkyl, halo, —CN, —OR', —OCN, —SeCN, —SR', —SCN, —OCOR', —OSO₂, and —OPO₃R'₂; and each R' is independently hydrogen, optionally substituted alkyl, optionally substituted heteroalkyl, optionally substituted aryl, or optionally substituted heteroaryl.

It should be understood that the osmium compounds described herein may also be provided as homologs, analogs, derivatives, enantiomers, diastereomers, tautomers, cis- and trans-isomers, and functionally equivalent compositions of compounds described herein. "Functionally equivalent" generally refers to a composition capable of treatment of patients having cancer, or of patients susceptible to cancers. For example, the osmium-nitrido compounds described may comprise one or more of the following structures:

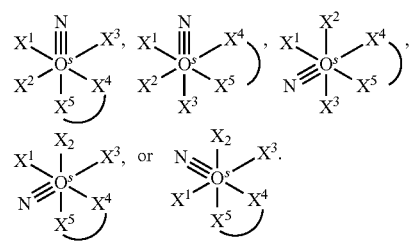

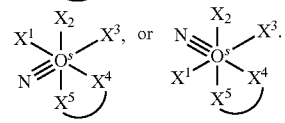

wherein $X^1$—$X^5$ are as described herein. In some embodiments, the nitrido ligand is in an axial position. In some embodiments, the nitrido ligand is in an equatorial position.

In some embodiments, both binding sites of the bidentate ligand are in an equatorial position. In some embodiments, one of the binding sites of the bidentate ligand is in an equatorial position and the other binding site is in an axial position.

It will be understood that the skilled artisan will be able to manipulate the conditions in a manner to prepare such homologs, analogs, derivatives, enantiomers, diastereomers, tautomers, cis- and trans-isomers, and functionally equivalent compositions. Homologs, analogs, derivatives, enantiomers, diastereomers, tautomers, cis- and trans-isomers, and functionally equivalent compositions which are about as effective or more effective than the parent compound are also intended for use in the method of the invention. Such compositions may also be screened by the assays described herein for increased potency and specificity towards a cancer, preferably with limited side effects. Synthesis of such compositions may be accomplished through typical chemical modification methods such as those routinely practiced in the art.

In some embodiments, for a compound of Formula (I) (or an isomer thereof), $X^1$, $X^2$, and $X^3$ are the same or different and are selected from the group consisting of optionally substituted alkyl, optionally substituted heteroalkyl, halo, —CN, —OR', —OCN, —SeCN, —SR', —SCN, —OCOR', —OSO$_2$, and —OPO$_3$R'$_2$; and each R' is independently hydrogen, optionally substituted alkyl, optionally substituted heteroalkyl, optionally substituted aryl, or optionally substituted heteroaryl. In some embodiments, $X^1$, $X^2$, and $X^3$ are halo. In some embodiments, $X^1$, $X^2$, and $X^3$ are chloro.

In some embodiments, for a compound of Formula (I) (or an isomer thereof), at least one of $X^1$, $X^2$, and $X^3$ is a leaving group. In some embodiments, at least two of $X^1$, $X^2$, and $X^3$ are a leaving group. As used herein, a "leaving group" is given its ordinary meaning in the art and refers to an atom or a group capable of being displaced by a nucleophile. Examples of suitable leaving groups include, but are not limited to, halides (such as chloride, bromide, and iodide), alkanesulfonyloxy, arenesulfonyloxy, alkyl-carbonyloxy (e.g., acetoxy, carboxylate), arylcarbonyloxy, mesyloxy, tosyloxy, trifluoromethane-sulfonyloxy, aryloxy, methoxy, N,O-dimethylhydroxylamino, pixyl, oxalato, malonato, and the like. In some embodiments, the leaving group is a halide or carboxylate. In some embodiments, the leaving group is chloride.

In some embodiments, for a compound of Formula (I) (or an isomer thereof), $X^4$ and $X^5$ are N. In some embodiments, $X^4$ and $X^5$ are O. In some embodiments, $X^4$ and $X^5$ are S. In some embodiments, $X^4$ and $X^5$ are P.

In some embodiments,

comprises me structure:

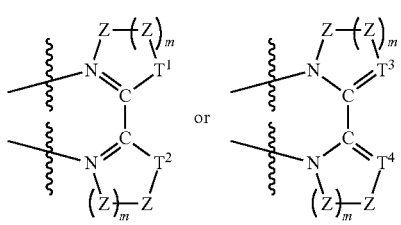

wherein:
each Z is independently —NR"—, —CR"=, —CR"$_2$—, —O—, or —S—;
$T^1$ and $T^2$ are independently —NR"—, —CR"=, —CR"$_2$—, —O—, or —S—, or optionally, $T^1$ and $T^2$ may be joined together to form a ring;
$T^3$ and $T^4$ are independently —N— or —CR"—, or optionally, $T^3$ and $T^4$ may be joined together to form a ring;
each R" is independently hydrogen, optionally substituted alkyl, optionally substituted heteroalkyl, optionally substituted alkenyl, optionally substituted alkynyl, optionally substituted aryl, or optionally substituted heteroaryl, or optionally, any two R" may be joined to form a ring; and
each m is independently 1 or 2. In some embodiments, each m is 1. In some embodiments, each m is 2. In some embodiments, one m is 1 and the other m is 2.

In some embodiments,

comprises the structure:

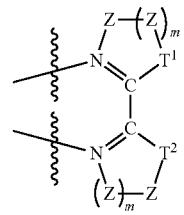

wherein:
each Z is independently —NR"—, —CR"=, —CR"$_2$—, —O—, or —S—;
$T^1$ and $T^2$ are independently —NR"—, —CR"=, —CR"$_2$—, —O—, or —S—, or optionally, $T^1$ and $T^2$ may be joined together to form a ring;
each R" is independently hydrogen, optionally substituted alkyl, optionally substituted heteroalkyl, optionally substituted alkenyl, optionally substituted alkynyl, optionally substituted aryl, or optionally substituted heteroaryl, or optionally, any two R" may be joined to form a ring; and
each m is independently 1 or 2. In some embodiments, each m is 1. In some embodiments, each m is 2. In some embodiments, one m is 1 and the other m is 2.

In some embodiments in which $X^4$ and $X^5$ are N,

comprises the structure:

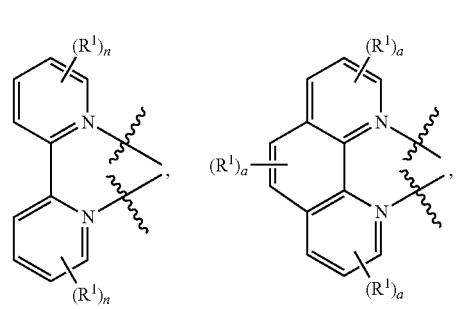

-continued

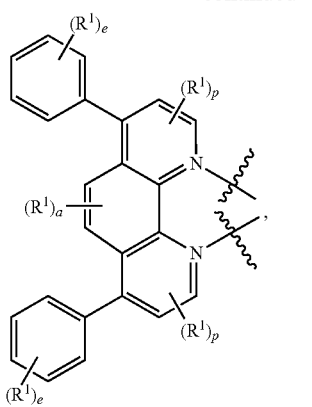

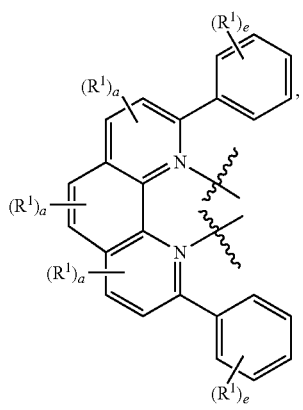

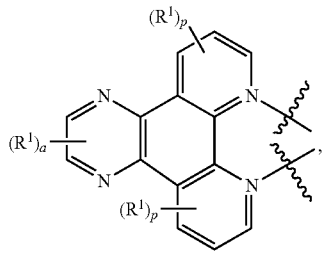

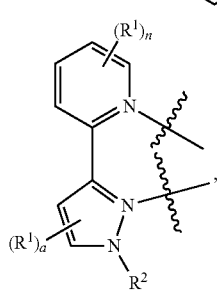

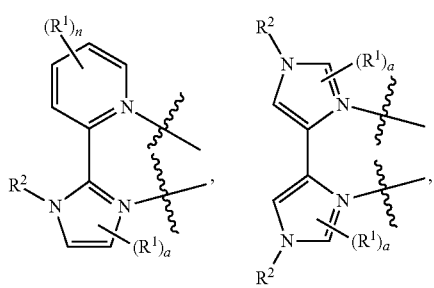

-continued

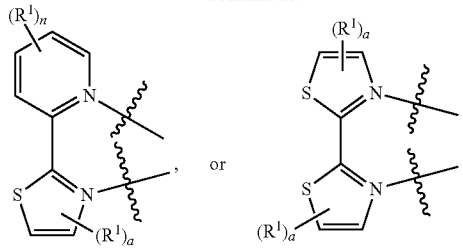

wherein:
each $R^1$ is independently —CN, —OR$^3$, —SR$^3$, —COOR$^3$, —OCOR$^3$, —N(R$^3$)$_2$, —NO$_2$, halo, optionally substituted alkyl, optionally substituted heteroalkyl, optionally substituted cycloheteroalkyl, optionally substituted alkenyl, optionally substituted alkynyl, optionally substituted aryl, or optionally substituted heteroaryl, or optionally any two $R^1$ may be joined to form a ring;
each $R^2$ is independently hydrogen, optionally substituted alkyl, optionally substituted heteroalkyl, optionally substituted aryl, optionally substituted heteroaryl, or optionally substituted alkoxy;
each $R^3$ is independently hydrogen, optionally substituted alkyl, optionally substituted heteroalkyl, optionally substituted aryl, or optionally substituted heteroaryl;
each e is independently 0, 1, 2, 3, 4, or 5;
each n is independently 0, 1, 2, 3, or 4;
each p is independently 0, 1, 2, or 3; and
each a is independently 0, 1, or 2. In some embodiments, each e, n, p, and a is 0.

In some embodiments in which $X^4$ and $X^5$ are N,

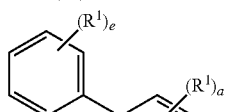

comprises the structure:

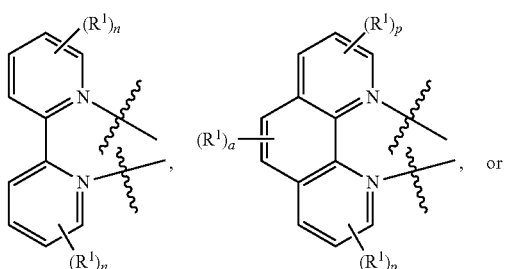

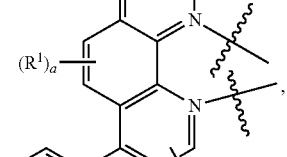

wherein:

each $R^1$ is independently —CN, —$OR^3$, —$SR^3$, —$COOR^3$, —$OCOR^3$, —$N(R^3)_2$, —$NO_2$, halo, optionally substituted alkyl, optionally substituted heteroalkyl, optionally substituted cycloheteroalkyl, optionally substituted alkenyl, optionally substituted alkynyl, optionally substituted aryl, or optionally substituted heteroaryl, or optionally any two $R^1$ may be joined to form a ring;

each $R^3$ is independently hydrogen, optionally substituted alkyl, optionally substituted heteroalkyl, optionally substituted aryl, or optionally substituted heteroaryl;

each e is independently 0, 1, 2, 3, 4, or 5;

each n is independently 0, 1, 2, 3, or 4;

each p is independently 0, 1, 2, or 3; and each a is independently 0, 1, or 2. In some embodiments, each e, n, p, and a is 0.

In some embodiments, for a compound of Formula (I) (or an isomer thereof), $X^4$ and $X^5$ are N and $$X^4 \frown X^5$$

comprises the structure:

[Structure with $(R^1)_e$, $(R^1)_a$ substituents on phenanthroline with phenyl groups]

wherein:

each $R^1$ is independently —CN, —$OR^3$, —$SR^3$, —$COOR^3$, —$OCOR^3$, —$N(R^3)_2$, —$NO_2$, halo, optionally substituted alkyl, optionally substituted heteroalkyl, optionally substituted cycloheteroalkyl, optionally substituted alkenyl, optionally substituted alkynyl, optionally substituted aryl, or optionally substituted heteroaryl;

each $R^3$ is independently hydrogen, optionally substituted alkyl, optionally substituted heteroalkyl, optionally substituted aryl, or optionally substituted heteroaryl;

each e is independently 0, 1, 2, 3, 4, or 5; and each a is independently 0, 1, or 2. In some embodiments, each e is 0. In some embodiments, each a is 0. In some embodiments, each of e and a is 0.

In some embodiments for a compound for Formula (I), $$N \frown N$$

comprises the structure:

[Bipyridine structure with $(R^1)_n$ substituents]

wherein:

each $R^1$ is independently —CN, —$OR^3$, —$SR^3$, —$COOR^3$, —$OCOR^3$, —$N(R^3)_2$, —$NO_2$, halo, optionally substituted alkyl, optionally substituted heteroalkyl, optionally substituted cycloheteroalkyl, optionally substituted alkenyl, optionally substituted alkynyl, optionally substituted aryl, or optionally substituted heteroaryl;

each $R^3$ is independently hydrogen, optionally substituted alkyl, optionally substituted heteroalkyl, optionally substituted aryl, or optionally substituted heteroaryl; and each n is independently 0, 1, 2, 3, or 4. In some embodiments, each n is 0.

In some embodiments, for a compound of Formula (I) (or an isomer thereof), $X^4$ and $X^5$ are N and $$X^4 \frown X^5$$

comprises the structure:

[Phenanthroline structure with $(R^1)_p$, $(R^1)_a$ substituents]

wherein:

each $R^1$ is independently —CN, —$OR^3$, —$SR^3$, —$COOR^3$, —$OCOR^3$, —$N(R^3)_2$, —$NO_2$, halo, optionally substituted alkyl, optionally substituted heteroalkyl, optionally substituted cycloheteroalkyl, optionally substituted alkenyl, optionally substituted alkynyl, optionally substituted aryl, or optionally substituted heteroaryl;

each $R^3$ is independently hydrogen, optionally substituted alkyl, optionally substituted heteroalkyl, optionally substituted aryl, or optionally substituted heteroaryl;

each a is independently 0, 1, or 2; and each p is independently 0, 1, 2, or 3. In some embodiments, each p is 0. In some embodiments, each a is 0. In some embodiments, each of p and a is 0. In some embodiment, each p is 2, a is 0, and each $R^1$ is alkyl, optionally substituted.

In some embodiments,

comprises the structure:

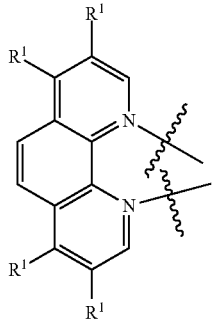

wherein:

each R¹ is independently —CN, —OR³, —SR³, —COOR³, —OCOR³, —N(R³)₂, —NO₂, halo, optionally substituted alkyl, optionally substituted heteroalkyl, optionally substituted cycloheteroalkyl, optionally substituted alkenyl, optionally substituted alkynyl, optionally substituted aryl, or optionally substituted heteroaryl; and each R³ is independently hydrogen, optionally substituted alkyl, optionally substituted heteroalkyl, optionally substituted aryl, or optionally substituted heteroaryl. In some embodiments, each R¹ is optionally substituted alkyl. In some embodiments, each R¹ is methyl.

In some embodiments, the compound of Formula (I) comprises Formula (II):

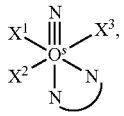

(II)

wherein:

X¹, X², and X³ are the same or different and are selected from the group consisting of optionally substituted alkyl, optionally substituted heteroalkyl, halo, —CN, —OR', —OCN, —SeCN, —SR', —SCN, —OCOR', —OSO₂, and —OPO₃R'₂; and

is a bidentate described herein. X¹, X², and X³ may be as described herein.

In some embodiments for a compound for Formula (II),

comprises the structure:

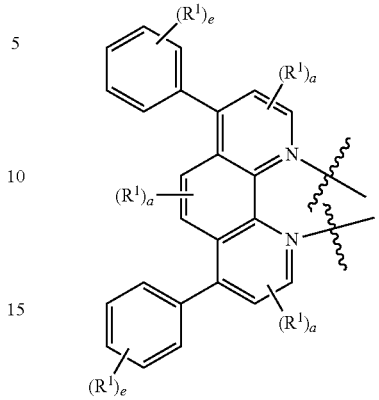

wherein:

each R¹ is independently —CN, —OR³, —SR³, —COOR³, —OCOR³, —N(R³)₂, —NO₂, halo, optionally substituted alkyl, optionally substituted heteroalkyl, optionally substituted cycloheteroalkyl, optionally substituted alkenyl, optionally substituted alkynyl, optionally substituted aryl, or optionally substituted heteroaryl;

each R³ is independently hydrogen, optionally substituted alkyl, optionally substituted heteroalkyl, optionally substituted aryl, or optionally substituted heteroaryl;

each e is independently 0, 1, 2, 3, 4, or 5; and each a is independently 0, 1, or 2. In some embodiments, each e is 0. In some embodiments, each a is 0. In some embodiments, each of e and a is 0.

In some embodiments for a compound for Formula (II),

N⌒N comprises the structure:

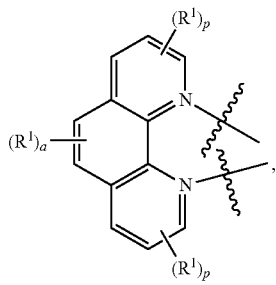

wherein:

each R¹ is independently —CN, —OR³, —SR³, —COOR³, —OCOR³, —N(R³)₂, —NO₂, halo, optionally substituted alkyl, optionally substituted heteroalkyl, optionally substituted cycloheteroalkyl, optionally substituted alkenyl, optionally substituted alkynyl, optionally substituted aryl, or optionally substituted heteroaryl;

each R³ is independently hydrogen, optionally substituted alkyl, optionally substituted heteroalkyl, optionally substituted aryl, or optionally substituted heteroaryl;

each a is independently 0, 1, or 2; and each p is independently 0, 1, 2, or 3. In some embodiments, each p is 0 or 2. In some embodiments, each a is 0.

In some embodiments, each of p is 2, a is 0, and R¹ is alkyl.
In some embodiments each p is 0 and each a is 0.

In some embodiments for a compound for Formula (II),

comprises me structure:

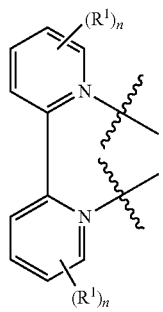

wherein:

each R¹ is independently —CN, —OR³, —SR³, —COOR³, —OCOR³, —N(R³)$_2$, —NO$_2$, halo, optionally substituted alkyl, optionally substituted heteroalkyl, optionally substituted cycloheteroalkyl, optionally substituted alkenyl, optionally substituted alkynyl, optionally substituted aryl, or optionally substituted heteroaryl;

each R³ is independently hydrogen, optionally substituted alkyl, optionally substituted heteroalkyl, optionally substituted aryl, or optionally substituted heteroaryl; and each n is independently 0, 1, 2, 3, or 4. In some embodiments, each p is 0. In some embodiments, each a is 0. In some embodiments, each of p and a is 0.

In some embodiments, for a compound of Formula (II),

comprises the structure:

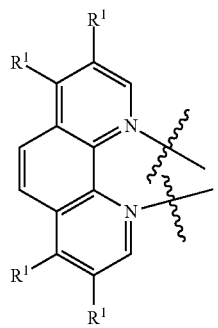

wherein:

each R¹ is independently —CN, —OR³, —SR³, —COOR³, —OCOR³, —N(R³)$_2$, —NO$_2$, halo, optionally substituted alkyl, optionally substituted heteroalkyl, optionally substituted cycloheteroalkyl, optionally substituted alkenyl, optionally substituted alkynyl, optionally substituted aryl, or optionally substituted heteroaryl; and each R³ is independently hydrogen, optionally substituted alkyl, optionally substituted heteroalkyl, optionally substituted aryl, or optionally substituted heteroaryl. In some cases, each R¹ is optionally substituted alkyl. In some cases, each R¹ is methyl.

In a particular embodiment, a compound of Formula (I) has the structure:

wherein

comprises me structure:

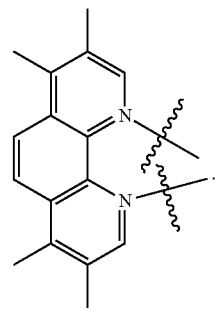

In another particular embodiment, a compound of Formula (I) has the structure:

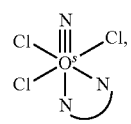

wherein

comprises the structure:

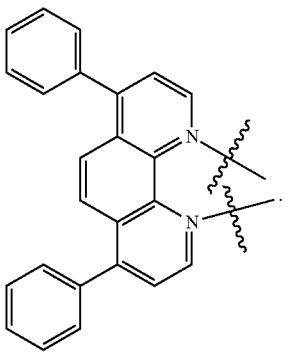

In one embodiment, a compound of Formula (I) has the structure:

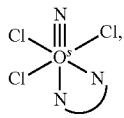

wherein

comprises me structure:

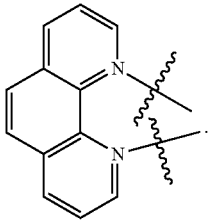

In another embodiment, a compound of Formula (I) has the structure:

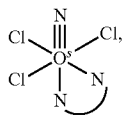

wherein

comprises the structure:

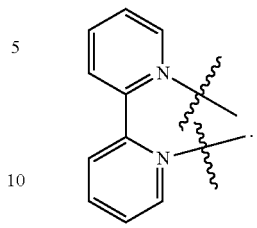

In some embodiments, the bidentate ligand comprises at least one targeting moiety, which may facilitate interaction between the osmium compound and cells, or portions thereof, such that the osmium compound is localized to a particular targeting site, for instance, a tumor, a disease site, a tissue, an organ, a type of cell, an organelle (e.g. endoplasmic reticulum). The targeting moiety may be directly covalently bound to the bidentate ligand or may be associated with the bidentate ligand via a linking moiety. In some such embodiments, $R^1$, as described above, may be optionally substituted with Q or optionally substituted with L-Q, wherein Q is a targeting moiety (e.g., peptide) and L is a linking moiety.

A targeting moiety, as used herein, is a moiety able to bind to or otherwise associate with a biological moiety, for example, a membrane component, a cell surface receptor, organelle component (e.g., ER component), or the like. Therefore, the targeting moiety may aid in the association and/or binding of compounds of Formula (I) with a specific site of a patient (e.g., a certain cell type, receptor, etc.). As a non-limiting example, the targeting entity may be an ER targeting peptide sequence that directs the compounds of Formula (I) to the ER of cells (e.g., cancer cells, cancer stem cells).

The term "binding," as used herein, refers to the interaction between a corresponding pair of molecules or portions thereof that exhibit mutual affinity or binding capacity, typically due to specific or non-specific binding or interaction, including, but not limited to, biochemical, physiological, and/or chemical interactions. "Biological binding" defines a type of interaction that occurs between pairs of molecules including proteins, nucleic acids, glycoproteins, carbohydrates, hormones, or the like. The term "binding partner" refers to a molecule that can undergo binding with a particular molecule. "Specific binding" refers to molecules, such as polynucleotides, that are able to bind to or recognize a binding partner (or a limited number of binding partners) to a substantially higher degree than to other, similar biological entities. In one set of embodiments, the targeting moiety has a specificity (as measured via a disassociation constant) of less than about 1 micromolar, at least about 10 micromolar, or at least about 100 micromolar.

Those of ordinary skill in the art are well aware of a wide variety of targeting moieties that can direct compounds to specific desired locations of a subject. An extensive body of literature exists on this subject and need not be repeated here for those of ordinary skill in the art to easily understand and widely practice aspects of the invention involving targeting. However, some examples are provided herein. Non-limiting examples of biological moieties which may be employed as targeting moieties include a peptide, a protein, an enzyme, a nucleic acid, a fatty acid, a hormone, an antibody, a carbohydrate, a peptidoglycan, a glycopeptide, or the like. These and other biological moieties are discussed in detail below.

In some cases, the biological moiety may be relatively large, for example, peptides, nucleic acids, or the like. For example, the biological moiety may have a molecular weight of at least about 1,000 Da, at least about 2,500 Da, at least about 3,000 Da, at least about 4,000 Da, or at least about 5,000 Da, etc. Relatively large targeting moieties may be useful, in some cases, for differentiating between cells. However, in other embodiments, the targeting moiety may be relatively small, for example, having a molecular weight of less than about 1,000 Da, less than about 500 Da, or less.

In one embodiment, the targeting moiety comprises a peptide. "Peptides" are well-known terms in the art, and are not precisely defined in the art in terms of the number of amino acids that each includes. As used herein, these terms are given their ordinary meaning in the art. Generally, peptides are amino acid sequences of less than about 100 amino acids in length, but can include sequences of up to 300 amino acids. In some cases, one or more of the amino acids of the peptide may be modified in some instances, for example, by the addition of a chemical entity such as a carbohydrate group, a phosphate group, a farnesyl group, an isofarnesyl group, a fatty acid group, a linker for conjugation, functionalization, or other modification, etc. Peptides may contains natural or non-natural (i.e., compounds that do not occur in nature but that can be incorporated into a polypeptide chain) amino acids and/or amino acid analogs as are known in the art.

Non-limiting examples of peptides targeting moieties include ER targeting sequences, such as KDEL, C1(1-29) of P450 C2 (i.e., MDPVVVLGL-CLSCLLLLSLWKQSYGGGKL (SEQ ID NO: 1)) and HLA-B27-binding peptides (e.g., RRFKEGGRGGKY (SEQ ID NO: 2) and RRYLENGKETL (SEQ ID NO: 3)).

When the targeting moiety is not directly covalently attached to the bidentate ligand, at least one $R^1$ is substituted with the structure -L-Q. For example, the targeting moiety may be a peptide, attached to the bidentate ligand via a linking moiety (e.g., three hydrophobic amino acids attached to the bidentate ligand via an ester moiety), that directs compounds of Formula (I) (e.g., that induce endoplasmic reticulum (ER) stress) to a particular cell or location within a cell (e.g., endoplasmic reticulum (ER)). In some embodiments, compounds of Formula (I) having a targeting moiety may affect cancer cells to a higher degree (e.g., two-fold, five-fold, ten-fold, 50-fold, 100-fold, 200-fold, 500-fold, 1000-fold) than substantially similar compounds of Formula (I) lacking a targeting moiety.

In some embodiments, the linking moiety comprises one or more of alkylene, alkenylene, alkynylene, arylene, heteroalkylene, heteroalkenylene, heteroalkynlene, heterocycle, cycloalkylene, heteroarylene, or a functional group. Non-limiting examples of functional groups which can be used in linking moieties include esters, amides, amines, ethers, ureas, carbamates, carbonates, and anhydride moieties. In certain embodiments, the linking moiety may be any suitable molecule that dissociates from the osmium compound under selected conditions. In some such cases, the linking moiety may comprise a hydrolyzable (e.g., ester) or otherwise degradable moiety that covalently links the linking moiety to the bidentate ligand. In some such embodiments, the linking moiety may be hydrolyzed by intracellular enzymes (e.g., esterases) or water. In one example, the linking moiety is a functional group or a sequence of three hydrophobic amino acids containing at least one functional group, which allows for the dissociation from the osmium compound under the selected conditions.

In certain embodiments, at least one $R^1$ may comprise the structure -L-Q wherein L is three hydrophobic amino acids (e.g., phenylalanine, tyrosine, tryptophan) attached to the bidentate ligand via an ester moiety, wherein each hydrophobic amino acid is the same or different and Q is a peptide (e.g., ER targeting sequence). In some such embodiments, each hydrophobic amino acid is independently selected from the group consisting of alanine, valine, isoleucine, leucine, phenylalanine, tryptophan, proline, and tyrosine. In certain instances, the hydrophobic amino acid may be natural. In other instances, the hydrophobic amino acid may be non-natural. Non-limiting examples of suitable non-natural hydrophobic amino acids include β-amino acids of alanine, valine, isoleucine, leucine, phenylalanine, tryptophan, and tyrosine; 3-substituted alanine; and ring-substituted phenylalanine, tryptophan and tyrosine.

For instance, in one embodiment in which a compound of Formula (I) comprises a targeting moiety, the compound has the structure:

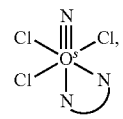

wherein

comprises me structure:

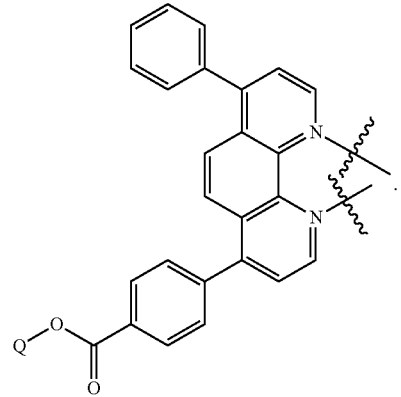

In another embodiment, in which a compound of Formula (I) comprises a targeting moiety, the compound has the structure:

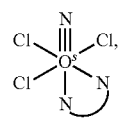

wherein

comprises the structure:

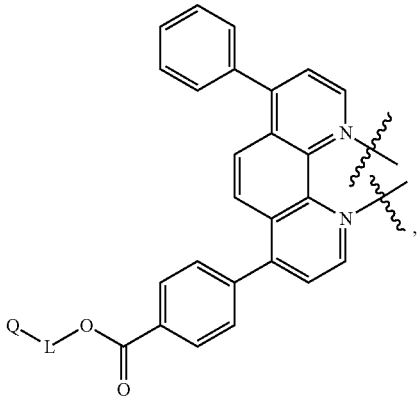

wherein L is a linking moiety and Q is a targeting moiety.

Osmium compounds may be synthesized according to methods known in the art, including various methods described herein. For example, the method may comprise reaction of an osmium nitrido precursor compound (e.g., $Os(N)X_3(NR^a_4)$, wherein X is a halide (e.g., Cl) and each $R^a$ is the same or different and is optionally substituted alkyl (e.g., ethyl) or optionally substituted aryl.

In some embodiments, methods for treating a subject having a cancer are provided, wherein the method comprises administering a therapeutically-effective amount of a compound, as described herein, to a subject having a cancer or suspected of having cancer. In some cases, the subject may be otherwise free of indications for treatment with said compound. In some cases, methods include use of cancer cells, including but not limited to mammalian cancer cells. In some instances, the mammalian cancer cells are human cancer cells. In some embodiments, the compounds and methods described herein are useful for treating cells which are resistant to other cancer treatment agents (e.g., cis-platinum). Without wishing to be bound by theory, this may be due, in part, to a different mechanism of action of the compounds described herein as compared to common cancer treatment agents. In some embodiments, the compounds of the invention possess one or more desirable, but unexpected, combinations of properties, including increased activity and/or cytotoxicity, mechanism of action, and reduction of adverse side effects. These compounds have been found to inhibit cancer growth, including proliferation, invasiveness, and metastasis, thereby rendering them particularly desirable for the treatment of cancer. In some embodiments, the compounds described herein have a mechanism of action comprising apoptosis.

Figure 4:
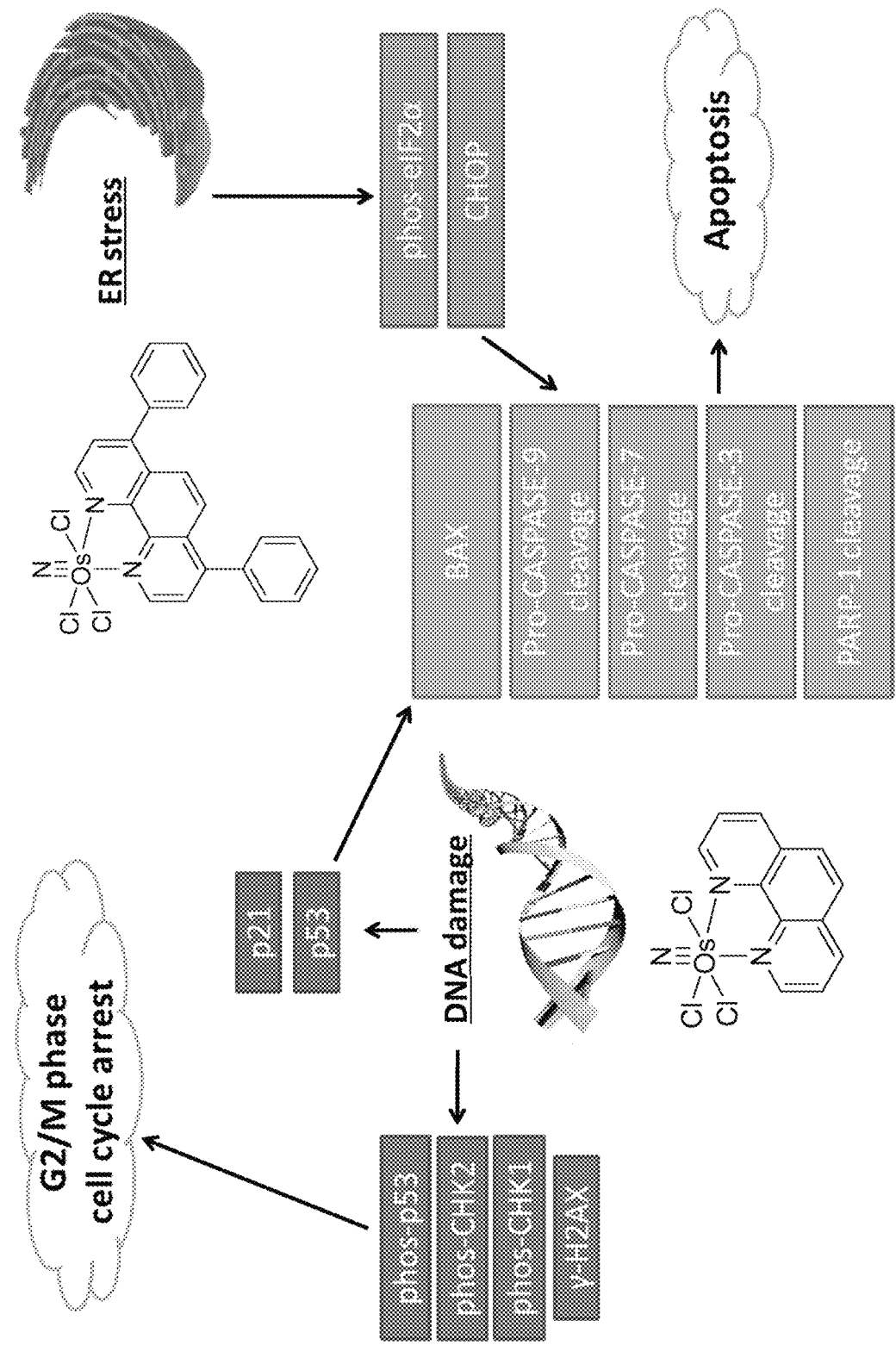
FIG. 4 shows a schematic of the proposed cellular mechanism of action of [OsN(phen))Cl$_3$] and [OsN(bathophen))Cl$_3$], according to some embodiments.

Without wishing to be bound by theory, it is believed that the mechanism of action of the osmium compounds may vary based on the hydrophobicity (e.g., as determined by the water-octanol partition coefficient (log P)) that the bidentate ligands imparts to the the osmium compounds. In some such cases, the bidentate ligand is used to tune the hydrophobicity of the osmium compound and accordingly, the mechanism of action. For example, osmium compounds having a log P below a certain threshold value may induce cell death in cancer cells by DNA damage as shown in FIG. 1. In some such embodiments, an osmium compound has a log P of less than about 1.7 (e.g., less than or equal to about 1.6, less than or equal to about 1.5, less than or equal to about 1.4, less than or equal to about 1.3, less than or equal to about 1.2, less than or equal to about 1.1, less than or equal to about 1, less than or equal to about 0.8). In another example, an osmium compound having a log P above a certain threshold value may cause cell death by inducing endoplasmic reticulum stress in cancer cells. In some such embodiments, an osmium compound has a log P of greater than or equal to about 1.7 (e.g., greater than or equal to about 1.75, greater than or equal to about 1.8, greater than or equal to about 1.85, greater than or equal to about 1.9, greater than or equal to about 1.95, greater than or equal to about 2.0). In some cases, the osmium compound has log P between about 1.7 and about 3.0 (e.g., between about 1.7 and about 2.5, between about 1.7 and about 2.2, between about 1.7 and about 2.1). In some cases, an osmium compound having a log P between about 1.7 and about 3.0 (e.g., between about 1.7 and about 2.5, between about 1.7 and about 2.2, between about 1.7 and about 2.1) may cause cell death by inducing endoplasmic reticulum stress in cancer cells. A schematic of the different mechanisms of action of osmium compounds having bidentate ligands with different hydrophobicities are shown in FIG. 4.

Those of ordinary skill in the art would be knowledgeable of methods of determining the water-octanol partition coefficient of compounds. For example, the log P of a compound may be obtained using the shake-flask method and graphite furnace atomic absorption spectroscopy (GF-AAS). Briefly, in the shake-flask method, octanol is pre-saturated with water by overnight incubation with shaking of a biphasic mixture of the two at room temperature. A portion of 0.5 mL water containing 50 µM of the given compound is incubated with the pre-saturated octanol (0.5 mL) in a 1.5 mL tube. The tube is shaken at room temperature for 3 hours. The two phases are separated by centrifugation and the osmium content (concentration) in each phase is determined by GFAAS. The log P is then calculated using the formula below:

$$\log P = \log 10[(\text{concentration of osmium in the octanol layer})/(\text{concentration of osmium in the water layer})].$$

In some embodiments, the compounds as described herein have substantially high cytotoxicities. In some cases, the $IC_{50}$ (e.g., for proliferating cells) for a compound of the present invention is less than about 10 uM (micromolar), less than about 8 uM, less than about 6 uM, less than about 4 uM, less than about 2 uM, less than about 1.5 uM, less than about 1.0 uM, less than about 0.9 uM, less than about 0.8 uM, less than about 0.7 uM, less than about 0.6 uM, less than about 0.5 uM, less than about 0.4 uM, less than about 0.3 uM, less than about 0.2 uM, less than about 0.1 uM, or less. In certain embodiments, the $IC_{50}$ (e.g., for proliferating cells) for a compound of the present invention is less than about 2 uM. In some instances, the toxicity of the osmium-nitrido compounds having the bidentate ligands, described herein, may have greater toxicity than other transition metal compounds (e.g., platinum anticancer agents).

In some embodiments, the osmium compounds, described herein, may exhibit selectivity toward cancer cells. That is, the osmium compounds may have deleterious effects on cancer cells (e.g., causing death of the cells) and/or affect cancer cells to a higher degree (e.g., two-fold, five-fold, ten-fold, 50-fold, 100-fold, 200-fold, 500-fold, 1000-fold) than non-cancer cells. For example, exposure of a plurality of cancer cells and a plurality of non-cancer cells to the platinum agent may substantially affect the plurality of cancer cells (e.g., cause the cancer cells to die or leads to the cell death) and may not substantially affect the non-cancer cells (e.g., may not cause the non-cancer cells to die or may not lead to cell death). In some cases, an osmium compound may be determined to substantially affect cancer cells and have little or no substantial effect on non-cancer cells (e.g., the agent is substantially inactive towards non-cancer cells) by determining the ratio of cancer cells which are affected (e.g., resulting in cell death by the agent) to non-cancer cells which are affected, following exposure to the compounds, described herein.

In some embodiments, the ratio of cancer cells to non-cancer cells which are affected (e.g., cell death) upon exposure to the compounds, described herein, is at least about 2:1, at least about 3:1, at least about 5:1, at least about 8:1, at least about 10:1, at least about 100:1, at least about 200:1, at least about 500:1, at least about 1000:1, at least about 5000:1, at least about 10,000:1, at least about 100,000:1, or greater. Those of ordinary skill in the art would be aware of methods and technologies for determining the ratio of cancer cells to non-cancer cells affected by the agent, as well as the number of cells which undergo cell death upon exposure to the agent. Other parameters may also be determined when determining whether an agent affects a cancer cell and/or a non-cancer cell, for example, tumor size, membrane potential of a cell, or presence or absence of a compound in parts of the cell (e.g., cytochrome c, apoptosis inducing factor, etc.).

The osmium compounds, described herein, may be particularly well suited for the treatment of cancers comprising cancer stem cells. In some embodiments, the osmium compounds have enhanced toxicity toward cancer stem cells. In some embodiments, the compounds, described herein, have substantially high cancer stem cell cytotoxicity. In some cases, the $IC_{50}$ for cancer stem cells for a compound of the present invention is less than about 10 uM, less than about 8 uM, less than about 6 uM, less than about 4 uM, less than about 2 uM, less than about 1.5 uM, less than about 1.0 uM, less than about 0.9 uM, less than about 0.8 uM, less than about 0.7 uM, less than about 0.6 uM, less than about 0.5 uM, less than about 0.4 uM, less than about 0.3 uM, less than about 0.2 uM, less than about 0.1 uM, or less. In certain embodiments, the $IC_{50}$ for cancer stem cells for a compound of the present invention is less than about 2 uM. In some instances, the toxicity of the osmium-nitrido compounds having the bidentate ligands, described herein, is greater toxicity than other anticancer agents.

In some embodiments, the osmium compounds have deleterious effects on cancer cells (e.g., causing death of the cells) and/or affect cancer cells to a higher degree (e.g., two-fold, five-fold, ten-fold, 50-fold, 100-fold, 200-fold, 500-fold, 1000-fold) than non-cancer cells and/or non-stem cell cancer cells. In some cases, the selectivity of an osmium compound toward cancer stem cells may be determined by determining the ratio of cancer stem cells which are affected (e.g., resulting in cell death by the agent) to non-cancer cells and/or non-stem cell cancer cells which are affected, following exposure to the compounds, described herein.

In some embodiments, the ratio of cancer stem cells (e.g., breast cancer stem cells) to non-cancer cells and/or non-stem cell cancer cells which are affected (e.g., cell death) upon exposure to the compounds, described herein, is at least about 1.2:1, is at least about 1.5:1, is at least about 2:1, is at least about 3:1, is at least about 4:1, is at least about 5:1, at least about 6:1, at least about 8:1, at least about 10:1, at least about 15:1, at least about 20:1, at least about 25:1, or greater. Those of ordinary skill in the art would be aware of methods and technologies for determining the ratio of cancer cells to non-cancer cells affected by the agent, as well as the number of cells which undergo cell death upon exposure to the agent.

In some embodiments, the compounds of the present invention may be used to prevent the growth of a tumor or cancer, and/or to prevent the metastasis of a tumor or cancer. In some embodiments, compositions of the invention may be used to shrink or destroy a cancer. It should be appreciated that compositions of the invention may be used alone or in combination with one or more additional anti-cancer agents or treatments (e.g., chemotherapeutic agents, targeted therapeutic agents, pseudo-targeted therapeutic agents, hormones, radiation, surgery, etc., or any combination of two or more thereof). In some embodiments, a composition of the invention may be administered to a patient who has undergone a treatment involving surgery, radiation, and/or chemotherapy. In certain embodiments, a composition of the invention may be administered chronically to prevent, or reduce the risk of, a cancer recurrence.

The cancers treatable by methods of the present invention preferably occur in mammals. Mammals include, for example, humans and other primates, as well as pet or companion animals, such as dogs and cats, laboratory animals, such as rats, mice and rabbits, and farm animals, such as horses, pigs, sheep, and cattle. In some embodiments, the compounds of the present invention may be used to treat or affect cancers including, but not limited to lymphatic metastases, squamous cell carcinoma, particularly of the head and neck, esophageal squamous cell carcinoma, oral carcinoma, blood cell malignancies, including multiple myeloma, leukemias, including acute lymphocytic leukemia, acute non-lymphocytic leukemia, chronic lymphocytic leukemia, chronic myelocytic leukemia, and hairy cell leukemia, effusion lymphomas (body cavity based lymphomas), thymic lymphoma lung cancer, including small cell carcinoma, cutaneous T cell lymphoma, Hodgkin's lymphoma, non-Hodgkin's lymphoma, cancer of the adrenal cortex, ACTH-producing tumors, non-small cell cancers, breast cancer, including small cell carcinoma and ductal carcinoma, gastrointestinal cancers, including stomach cancer, colon cancer, colorectal cancer, polyps associated with colorectal neoplasia, pancreatic cancer, liver cancer, urological cancers, including bladder cancer, including primary superficial bladder tumors, invasive transitional cell carcinoma of the bladder, and muscle-invasive bladder cancer, prostate cancer, malignancies of the female genital tract, including ovarian carcinoma, primary peritoneal epithelial neoplasms, cervical carcinoma, uterine endometrial cancers, vaginal cancer, cancer of the vulva, uterine cancer and solid tumors in the ovarian follicle, malignancies of the male genital tract, including testicular cancer and penile cancer, kidney cancer, including renal cell carcinoma, brain cancer, including intrinsic brain tumors, neuroblastoma, astrocytic brain tumors, gliomas, metastatic tumor cell invasion in the central nervous system, bone cancers, including osteomas and osteosarcomas, skin cancers, including malignant melanoma, tumor progression of human skin keratinocytes, squamous cell cancer, thyroid cancer, retinoblastoma, neuroblastoma, peritoneal effusion, malignant pleural effusion, mesothelioma, gall bladder cancer, trophoblastic neoplasms, and hemangiopericytoma. In some cases, the cancer is lung, ovarian, cervix, breast, bone, colorectal, and/or prostate cancer.

The invention further comprises compositions (including pharmaceutical compositions), preparations, formulations, kits, and the like, comprising any of the compounds as described herein. In some cases, a pharmaceutical composition is provided comprising a composition as described herein, or a pharmaceutically acceptable salt thereof, and one or more pharmaceutically acceptable carriers, additives and/or diluents. In some cases, a kit (e.g., for the treatment of cancer) comprises a composition (or a pharmaceutical composition) as described herein and instructions for use of the composition (or a pharmaceutical composition) for treatment of cancer. These and other embodiments of the invention may also involve promotion of the treatment of cancer or tumor according to any of the techniques and compositions and combinations of compositions described herein.

In some embodiments, the present invention provides "pharmaceutical compositions" or "pharmaceutically acceptable" compositions, which comprise a therapeutically effective amount of one or more of the compounds described herein, formulated together with one or more pharmaceutically acceptable carriers (additives) and/or diluents. The pharmaceutical compositions of the present invention may be specially formulated for administration in solid or liquid form, including those adapted for the following: oral administration, for example, drenches (aqueous or non-aqueous solutions or suspensions), tablets, e.g., those targeted for buccal, sublingual, and systemic absorption, boluses, powders, granules, pastes for application to the tongue; parenteral administration, for example, by subcutaneous, intramuscular, intravenous or epidural injection as, for example, a sterile solution or suspension, or sustained-release formulation; topical application, for example, as a cream, ointment, or a controlled-release patch or spray applied to the skin, lungs, or oral cavity; intravaginally or intrarectally, for example, as a pessary, cream or foam; sublingually; ocularly; transdermally; or nasally, pulmonary and to other mucosal surfaces.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The phrase "pharmaceutically-acceptable carrier" as used herein means a pharmaceutically-acceptable material, composition or vehicle, such as a liquid or solid filler, diluent, excipient, or solvent encapsulating material, involved in carrying or transporting the subject compound from one organ, or portion of the body, to another organ, or portion of the body. Each carrier must be "acceptable" in the sense of being compatible with the other ingredients of the formulation and not injurious to the patient. Some examples of materials which can serve as pharmaceutically-acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; pH buffered solutions; polyesters, polycarbonates and/or polyanhydrides; and other non-toxic compatible substances employed in pharmaceutical formulations.

As set out herein, certain embodiments of the present compounds may contain be formed or provided as a salt, and in some cases, as a pharmaceutically acceptable salt. The term "pharmaceutically-acceptable salt" in this respect refers to the relatively non-toxic, inorganic, and organic salts of compounds of the present invention. These salts can be prepared in situ in the administration vehicle or the dosage form manufacturing process, or by separately reacting a purified compound of the invention followed by reaction with a suitable reactant (e.g., suitable organic or inorganic acid and/or base), and isolating the salt thus formed during subsequent purification. Representative salts include the hydrobromide, hydrochloride, sulfate, bisulfate, phosphate, nitrate, acetate, valerate, oleate, palmitate, stearate, laurate, benzoate, lactate, phosphate, tosylate, citrate, maleate, fumarate, succinate, tartrate, napthylate, mesylate, glucoheptonate, lactobionate, and laurylsulphonate salts and the like. (See, for example, Berge et al., "Pharmaceutical Salts," J. Pharm. Sci. 1977, 66, 1-19)

The pharmaceutically acceptable salts of the subject compounds include the conventional nontoxic salts or quaternary ammonium salts of the compounds, e.g., from non-toxic organic or inorganic acids. For example, such conventional nontoxic salts include those derived from inorganic acids such as hydrochloride, hydrobromic, sulfuric, sulfamic, phosphoric, nitric, and the like; and the salts prepared from organic acids such as acetic, propionic, succinic, glycolic, stearic, lactic, malic, tartaric, citric, ascorbic, palmitic, maleic, hydroxymaleic, phenylacetic, glutamic, benzoic, salicyclic, sulfanilic, 2-acetoxybenzoic, fumaric, toluenesulfonic, methanesulfonic, ethane disulfonic, oxalic, isothionic, and the like.

Wetting agents, emulsifiers and lubricants, such as sodium lauryl sulfate and magnesium stearate, as well as coloring agents, release agents, coating agents, sweetening, flavoring and perfuming agents, preservatives and antioxidants can also be present in the compositions.

Examples of pharmaceutically-acceptable antioxidants include: water soluble antioxidants, such as ascorbic acid, cysteine hydrochloride, sodium bisulfate, sodium metabisulfite, sodium sulfite and the like; oil-soluble antioxidants, such as ascorbyl palmitate, butylated hydroxyanisole (BHA), butylated hydroxytoluene (BHT), lecithin, propyl gallate, alpha-tocopherol, and the like; and metal chelating agents, such as citric acid, ethylenediamine tetraacetic acid (EDTA), sorbitol, tartaric acid, phosphoric acid, and the like.

The compound may be orally administered, parenterally administered, subcutaneously administered, and/or intravenously administered. In certain embodiments, a compound or pharmaceutical preparation is administered orally. In other embodiments, the compound or pharmaceutical preparation is administered intravenously. Alternative routes of administration include sublingual, intramuscular, and transdermal administrations.

Formulations of the present invention include those suitable for oral, nasal, topical (including buccal and sublingual), rectal, vaginal and/or parenteral administration. The formulations may conveniently be presented in unit dosage form and may be prepared by any methods well known in the art of pharmacy. The amount of active ingredient that can be combined with a carrier material to produce a single dosage form will vary depending upon the host being treated, and the particular mode of administration. The amount of active ingredient that can be combined with a carrier material to produce a single dosage form will generally be that amount of the compound which produces a therapeutic effect. Generally, this amount will range from about 1% to about 99% of active ingredient, from about 5% to about 70%, or from about 10% to about 30%.

In certain embodiments, a formulation of the present invention comprises an excipient selected from the group consisting of cyclodextrins, liposomes, micelle forming agents, e.g., bile acids, and polymeric carriers, e.g., polyesters and polyanhydrides; and a compound of the present invention. In certain embodiments, an aforementioned formulation renders orally bioavailable a compound of the present invention.

Methods of preparing these formulations or compositions include the step of bringing into association a compound of the present invention with the carrier and, optionally, one or more accessory ingredients. In general, the formulations are prepared by uniformly and intimately bringing into association a compound of the present invention with liquid carriers, or finely divided solid carriers, or both, and then, if necessary, shaping the product.

Formulations of the invention suitable for oral administration may be in the form of capsules, cachets, pills, tablets, lozenges (using a flavored basis, usually sucrose and acacia or tragacanth), powders, granules, or as a solution or a suspension in an aqueous or non-aqueous liquid, or as an oil-in-water or water-in-oil liquid emulsion, or as an elixir or syrup, or as pastilles (using an inert base, such as gelatin and glycerin, or sucrose and acacia) and/or as mouth washes and the like, each containing a predetermined amount of a compound of the present invention as an active ingredient. A compound of the present invention may also be administered as a bolus, electuary, or paste.

In solid dosage forms of the invention for oral administration (capsules, tablets, pills, dragees, powders, granules and the like), the active ingredient is mixed with one or more pharmaceutically-acceptable carriers, such as sodium citrate or dicalcium phosphate, and/or any of the following: fillers or extenders, such as starches, lactose, sucrose, glucose, mannitol, and/or silicic acid; binders, such as, for example, carboxymethylcellulose, alginates, gelatin, polyvinyl pyrrolidone, sucrose and/or acacia; humectants, such as glycerol; disintegrating agents, such as agar-agar, calcium carbonate, potato or tapioca starch, alginic acid, certain silicates, and sodium carbonate; solution retarding agents, such as paraffin; absorption accelerators, such as quaternary ammonium compounds; wetting agents, such as, for example, cetyl alcohol, glycerol monostearate, and non-ionic surfactants; absorbents, such as kaolin and bentonite clay; lubricants, such as talc, calcium stearate, magnesium stearate, solid polyethylene glycols, sodium lauryl sulfate, and mixtures thereof; and coloring agents. In the case of capsules, tablets and pills, the pharmaceutical compositions may also comprise buffering agents. Solid compositions of a similar type may also be employed as fillers in soft and hard-shelled gelatin capsules using such excipients as lactose or milk sugars, as well as high molecular weight polyethylene glycols and the like.

A tablet may be made by compression or molding, optionally with one or more accessory ingredients. Compressed tablets may be prepared using binder (for example, gelatin or hydroxypropylmethyl cellulose), lubricant, inert diluent, preservative, disintegrant (for example, sodium starch glycolate or cross-linked sodium carboxymethyl cellulose), surface-active or dispersing agent. Molded tablets may be made in a suitable machine in which a mixture of the powdered compound is moistened with an inert liquid diluent.

The tablets, and other solid dosage forms of the pharmaceutical compositions of the present invention, such as dragees, capsules, pills and granules, may optionally be scored or prepared with coatings and shells, such as enteric coatings and other coatings well known in the pharmaceutical-formulating art. They may also be formulated so as to provide slow or controlled release of the active ingredient therein using, for example, hydroxypropylmethyl cellulose in varying proportions to provide the desired release profile, other polymer matrices, liposomes, and/or microspheres. They may be formulated for rapid release, e.g., freeze-dried. They may be sterilized by, for example, filtration through a bacteria-retaining filter, or by incorporating sterilizing agents in the form of sterile solid compositions that can be dissolved in sterile water, or some other sterile injectable medium immediately before use. These compositions may also optionally contain opacifying agents and may be of a composition that they release the active ingredient(s) only, or in a certain portion of the gastrointestinal tract, optionally, in a delayed manner. Examples of embedding compositions that can be used include polymeric substances and waxes. The active ingredient can also be in micro-encapsulated form, if appropriate, with one or more of the above-described excipients.

Liquid dosage forms for oral administration of the compounds of the invention include pharmaceutically acceptable emulsions, microemulsions, solutions, suspensions, syrups, and elixirs. In addition to the active ingredient, the liquid dosage forms may contain inert diluents commonly used in the art, such as, for example, water or other solvents, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, and mixtures thereof.

Besides inert diluents, the oral compositions can also include adjuvants such as wetting agents, emulsifying and suspending agents, sweetening, flavoring, coloring, perfuming, and preservative agents.

Suspensions, in addition to the active compounds, may contain suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

Formulations of the pharmaceutical compositions of the invention for rectal or vaginal administration may be presented as a suppository, which may be prepared by mixing one or more compounds of the invention with one or more suitable nonirritating excipients or carriers comprising, for example, cocoa butter, polyethylene glycol, a suppository wax or a salicylate, and which is solid at room temperature, but liquid at body temperature and, therefore, will melt in the rectum or vaginal cavity and release the active compound.

Formulations of the present invention which are suitable for vaginal administration also include pessaries, tampons, creams, gels, pastes, foams or spray formulations containing such carriers as are known in the art to be appropriate.

Dosage forms for the topical or transdermal administration of a compound of this invention include powders, sprays, ointments, pastes, creams, lotions, gels, solutions, patches and inhalants. The active compound may be mixed under sterile conditions with a pharmaceutically acceptable carrier, and with any preservatives, buffers, or propellants which may be required.

The ointments, pastes, creams, and gels may contain, in addition to an active compound of this invention, excipients, such as animal and vegetable fats, oils, waxes, paraffins, starch, tragacanth, cellulose derivatives, polyethylene glycols, silicones, bentonites, silicic acid, talc and zinc oxide, or mixtures thereof.

Powders and sprays can contain, in addition to a compound of this invention, excipients such as lactose, talc, silicic acid, aluminum hydroxide, calcium silicates and polyamide powder, or mixtures of these substances. Sprays can additionally contain customary propellants, such as chlorofluorohydrocarbons and volatile unsubstituted hydrocarbons, such as butane and propane.

Transdermal patches have the added advantage of providing controlled delivery of a compound of the present invention to the body. Dissolving or dispersing the compound in the proper medium can make such dosage forms. Absorption enhancers can also be used to increase the flux of the compound across the skin. Either providing a rate controlling membrane or dispersing the compound in a polymer matrix or gel can control the rate of such flux.

Ophthalmic formulations, eye ointments, powders, solutions and the like, are also contemplated as being within the scope of this invention.

Pharmaceutical compositions of this invention suitable for parenteral administration comprise one or more compounds of the invention in combination with one or more pharmaceutically-acceptable sterile isotonic aqueous or non-aqueous solutions, dispersions, suspensions or emulsions, or sterile powders which may be reconstituted into sterile injectable solutions or dispersions just prior to use, which may contain sugars, alcohols, antioxidants, buffers, bacteriostats, solutes which render the formulation isotonic with the blood of the intended recipient or suspending or thickening agents.

Examples of suitable aqueous and non-aqueous carriers, which may be employed in the pharmaceutical compositions of the invention include water, ethanol, polyols (such as glycerol, propylene glycol, polyethylene glycol, and the like), and suitable mixtures thereof, vegetable oils, such as olive oil, and injectable organic esters, such as ethyl oleate. Proper fluidity can be maintained, for example, by the use of coating materials, such as lecithin, by the maintenance of the required particle size in the case of dispersions, and by the use of surfactants.

These compositions may also contain adjuvants such as preservatives, wetting agents, emulsifying agents, and dispersing agents. Prevention of the action of microorganisms upon the subject compounds may be ensured by the inclusion of various antibacterial and antifungal agents, for example, paraben, chlorobutanol, phenol sorbic acid, and the like. It may also be desirable to include isotonic agents, such as sugars, sodium chloride, and the like into the compositions. In addition, prolonged absorption of the injectable pharmaceutical form may be brought about by the inclusion of agents which delay absorption such as aluminum monostearate and gelatin.

Delivery systems suitable for use with the present invention include time-release, delayed release, sustained release, or controlled release delivery systems, as described herein. Such systems may avoid repeated administrations of the active compounds of the invention in many cases, increasing convenience to the subject and the physician. Many types of release delivery systems are available and known to those of ordinary skill in the art. They include, for example, polymer based systems such as polylactic and/or polyglycolic acid, polyanhydrides, and polycaprolactone; nonpolymer systems that are lipid-based including sterols such as cholesterol, cholesterol esters, and fatty acids or neutral fats such as mono-, di- and triglycerides; hydrogel release systems; silastic systems; peptide based systems; wax coatings; compressed tablets using conventional binders and excipients; or partially fused implants. Specific examples include, but are not limited to, erosional systems in which the composition is contained in a form within a matrix, or diffusional systems in which an active component controls the release rate. The formulation may be as, for example, microspheres, hydrogels, polymeric reservoirs, cholesterol matrices, or polymeric systems. In some embodiments, the system may allow sustained or controlled release of the active compound to occur, for example, through control of the diffusion or erosion/degradation rate of the formulation. In addition, a pump-based hardware delivery system may be used in some embodiment of the invention.

Use of a long-term release implant may be particularly suitable in some cases. "Long-term release," as used herein, means that the implant is constructed and arranged to deliver therapeutic levels of the composition for at least about 30 or about 45 days, for at least about 60 or about 90 days, or even longer in some cases. Long-term release implants are well known to those of ordinary skill in the art, and include some of the release systems described above.

In some cases, in order to prolong the effect of a drug, it is desirable to slow the absorption of the drug from subcutaneous or intramuscular injection. This may be accomplished by the use of a liquid suspension of crystalline or amorphous material having poor water solubility. The rate of absorption of the drug then depends upon its rate of dissolution, which in turn, may depend upon crystal size and crystalline form. Alternatively, delayed absorption of a parenterally administered drug form is accomplished by dissolving or suspending the drug in an oil vehicle.

Injectable depot forms are made by forming microencapsule matrices of the subject compounds in biodegradable polymers such as polylactide-polyglycolide. Depending on the ratio of drug to polymer, and the nature of the particular polymer employed, the rate of drug release can be controlled. Examples of other biodegradable polymers include poly(orthoesters) and poly(anhydrides). Depot injectable formulations are also prepared by entrapping the drug in liposomes or microemulsions, which are compatible with body tissue.

When the compounds of the present invention are administered as pharmaceuticals, to humans and animals, they can be given per se or as a pharmaceutical composition containing, for example, about 0.1% to about 99.5%, about 0.5% to about 90%, or the like, of active ingredient in combination with a pharmaceutically acceptable carrier.

The administration may be localized (i.e., to a particular region, physiological system, tissue, organ, or cell type) or systemic, depending on the condition to be treated. For example, the composition may be administered through parental injection, implantation, orally, vaginally, rectally, buccally, pulmonary, topically, nasally, transdermally, surgical administration, or any other method of administration where access to the target by the composition is achieved. Examples of parental modalities that can be used with the invention include intravenous, intradermal, subcutaneous, intracavity, intramuscular, intraperitoneal, epidural, or intrathecal. Examples of implantation modalities include any implantable or injectable drug delivery system. Oral administration may be useful for some treatments because of the convenience to the patient as well as the dosing schedule.

Regardless of the route of administration selected, the compounds of the present invention, which may be used in a suitable hydrated form, and/or the pharmaceutical compositions of the present invention, are formulated into pharmaceutically-acceptable dosage forms by conventional methods known to those of skill in the art.

The compositions of the present invention may be given in dosages, generally, at the maximum amount while avoiding or minimizing any potentially detrimental side effects. The compositions can be administered in effective amounts, alone or in a cocktail with other compounds, for example, other compounds that can be used to treat cancer. An effective amount is generally an amount sufficient to inhibit cancer within the subject.

One of skill in the art can determine what an effective amount of the composition is by screening the ability of the composition using any of the assays described herein. The effective amounts will depend, of course, on factors such as the severity of the condition being treated; individual patient parameters including age, physical condition, size, and weight; concurrent treatments; the frequency of treatment; or the mode of administration. These factors are well known to those of ordinary skill in the art and can be addressed with no more than routine experimentation. In some cases, a maximum dose be used, that is, the highest safe dose according to sound medical judgment.

Actual dosage levels of the active ingredients in the pharmaceutical compositions of this invention may be varied so as to obtain an amount of the active ingredient that is effective to achieve the desired therapeutic response for a particular patient, composition, and mode of administration, without being toxic to the patient.

The selected dosage level will depend upon a variety of factors including the activity of the particular compound of the present invention employed, or the ester, salt or amide thereof, the route of administration, the time of administration, the rate of excretion or metabolism of the particular compound being employed, the duration of the treatment, other drugs, compounds and/or materials used in combination with the particular compound employed, the age, sex, weight, condition, general health and prior medical history of the patient being treated, and like factors well known in the medical arts.

A physician or veterinarian having ordinary skill in the art can readily determine and prescribe the effective amount of the pharmaceutical composition required. For example, the physician or veterinarian could start doses of the compounds of the invention employed in the pharmaceutical composition at levels lower than that required to achieve the desired therapeutic effect and then gradually increasing the dosage until the desired effect is achieved.

In some embodiments, a compound or pharmaceutical composition of the invention is provided to a subject chronically. Chronic treatments include any form of repeated administration for an extended period of time, such as repeated administrations for one or more months, between a month and a year, one or more years, or longer. In many embodiments, a chronic treatment involves administering a compound or pharmaceutical composition of the invention repeatedly over the life of the subject. For example, chronic treatments may involve regular administrations, for example one or more times a day, one or more times a week, or one or more times a month. In general, a suitable dose such as a daily dose of a compound of the invention will be that amount of the compound that is the lowest dose effective to produce a therapeutic effect. Such an effective dose will generally depend upon the factors described above. Generally doses of the compounds of this invention for a patient, when used for the indicated effects, will range from about 0.0001 to about 100 mg per kg of body weight per day. The daily dosage may range from 0.001 to 50 mg of compound per kg of body weight, or from 0.01 to about 10 mg of compound per kg of body weight. In some cases, the dose may range from between about 5 and about 50 mg of compound per kg of body weight, between about 10 and about 40 mg of compound per kg of body weight, between about 10 and about 35 mg of compound per kg of body weight, or between about 15 and about 40 mg of compound per kg of body weight. However, lower or higher doses can be used. In some embodiments, the dose administered to a subject may be modified as the physiology of the subject changes due to age, disease progression, weight, or other factors.

If desired, the effective daily dose of the active compound may be administered as two, three, four, five, six or more sub-doses administered separately at appropriate intervals throughout the day, optionally, in unit dosage forms.

While it is possible for a compound of the present invention to be administered alone, it may be administered as a pharmaceutical formulation (composition) as described above.

The present invention also provides any of the above-mentioned compositions useful for treatment of cancer packaged in kits, optionally including instructions for use of the composition for the treatment of cancer. That is, the kit can include a description of use of the composition for participation in any biological or chemical mechanism disclosed herein associated with cancer or tumor. The kits can further include a description of activity of cancer in treating the pathology, as opposed to the symptoms of the cancer. That is, the kit can include a description of use of the compositions as discussed herein. The kit also can include instructions for use of a combination of two or more compositions of the invention. Instructions also may be provided for administering the drug by any suitable technique, such as orally, intravenously, or via another known route of drug delivery. The invention also involves promotion of the treatment of cancer according to any of the techniques and compositions and composition combinations described herein.

The compositions of the invention, in some embodiments, may be promoted for treatment of abnormal cell proliferation, cancers, or tumors, or includes instructions for treatment of accompany cell proliferation, cancers, or tumors, as mentioned above. In another aspect, the invention provides a method involving promoting the prevention or treatment of cancer via administration of any one of the compositions of the present invention, and homologs, analogs, derivatives, enantiomers and functionally equivalent compositions thereof in which the composition is able to treat cancers. As used herein, "promoted" includes all methods of doing business including methods of education, hospital and other clinical instruction, pharmaceutical industry activity including pharmaceutical sales, and any advertising or other promotional activity including written, oral and electronic communication of any form, associated with compositions of the invention in connection with treatment of cell proliferation, cancers or tumors. "Instructions" can define a component of promotion, and typically involve written instructions on or associated with packaging of compositions of the invention. Instructions also can include any oral or electronic instructions provided in any manner. The "kit" typically defines a package including any one or a combination of the compositions of the invention and the instructions, or homologs, analogs, derivatives, enantiomers and functionally equivalent compositions thereof, but can also include the composition of the invention and instructions of any form that are provided in connection with the composition in a manner such that a clinical professional will clearly recognize that the instructions are to be associated with the specific composition.

The kits described herein may also contain one or more containers, which can contain compounds such as the species, signaling entities, biomolecules, and/or particles as described. The kits also may contain instructions for mixing, diluting, and/or administrating the compounds. The kits also can include other containers with one or more solvents, surfactants, preservatives, and/or diluents (e.g., normal saline (0.9% NaCl), or 5% dextrose) as well as containers for mixing, diluting or administering the components to the sample or to the patient in need of such treatment.

The compositions of the kit may be provided as any suitable form, for example, as liquid solutions or as dried powders. When the composition provided is a dry powder, the powder may be reconstituted by the addition of a suitable solvent, which may also be provided. In embodiments where liquid forms of the composition are sued, the liquid form may be concentrated or ready to use. The solvent will depend on the compound and the mode of use or administration. Suitable solvents for drug compositions are well known and are available in the literature. The solvent will depend on the compound and the mode of use or administration.

The kit, in one set of embodiments, may comprise a carrier means being compartmentalized to receive in close confinement one or more container means such as vials, tubes, and the like, each of the container means comprising one of the separate elements to be used in the method. For example, one of the container means may comprise a positive control in the assay. Additionally, the kit may include containers for other components, for example, buffers useful in the assay.

For convenience, before further description of the present invention, certain terms employed in the specification, examples and appended claims are collected here. These definitions should be read in light of the remainder of the disclosure and understood as by a person of skill in the art. Unless defined otherwise, all technical and scientific terms used herein have the same meaning as commonly understood by a person of ordinary skill in the art.

As used herein, a "subject" or a "patient" refers to any mammal (e.g., a human), such as a mammal that may be susceptible to tumorigenesis or cancer. Examples include a human, a non-human primate, a cow, a horse, a pig, a sheep, a goat, a dog, a cat, or a rodent such as a mouse, a rat, a hamster, or a guinea pig. Generally, or course, the invention is directed toward use with humans. A subject may be a subject diagnosed with cancer or otherwise known to have cancer. In certain embodiments, a subject may be selected for treatment on the basis of a known cancer in the subject. In some embodiments, a subject may be selected for treatment on the basis of a suspected cancer in the subject. In some embodiments, a cancer may be diagnosed by detecting a mutation associate in a biological sample (e.g., urine, sputum, whole blood, serum, stool, etc., or any combination thereof. Accordingly, a compound or composition of the invention may be administered to a subject based, at least in part, on the fact that a mutation is detected in at least one sample (e.g., biopsy sample or any other biological sample) obtained from the subject. In some embodiments, a cancer may not have been detected or located in the subject, but the presence of a mutation associated with a cancer in at least one biological sample may be sufficient to prescribe or administer one or more compositions of the invention to the subject. In some embodiments, the composition may be administered to prevent the development of a cancer. However, in some embodiments, the presence of an existing cancer may be suspected, but not yet identified, and a composition of the invention may be administered to prevent further growth or development of the cancer.

It should be appreciated that any suitable technique may be used to identify or detect mutation and/or over-expression associated with a cancer. For example, nucleic acid detection techniques (e.g., sequencing, hybridization, etc.) or peptide detection techniques (e.g., sequencing, antibody-based detection, etc.) may be used. In some embodiments, other techniques may be used to detect or infer the presence of a cancer (e.g., histology, etc.).

The presence of a cancer can be detected or inferred by detecting a mutation, over-expression, amplification, or any combination thereof at one or more other loci associated with a signaling pathway of a cancer.

A "sample," as used herein, is any cell, body tissue, or body fluid sample obtained from a subject. Non-limiting examples of body fluids include, for example, lymph, saliva, blood, urine, and the like. Samples of tissue and/or cells for use in the various methods described herein can be obtained through standard methods including, but not limited to, tissue biopsy, including punch biopsy and cell scraping, needle biopsy; or collection of blood or other bodily fluids by aspiration or other suitable methods.

The phrase "therapeutically effective amount" as used herein means that amount of a compound, material, or composition comprising a compound of the present invention which is effective for producing some desired therapeutic effect in a subject at a reasonable benefit/risk ratio applicable to any medical treatment. Accordingly, a therapeutically effective amount prevents, minimizes, or reverses disease progression associated with a cancer. Disease progression can be monitored by clinical observations, laboratory and imaging investigations apparent to a person skilled in the art. A therapeutically effective amount can be an amount that is effective in a single dose or an amount that is effective as part of a multi-dose therapy, for example an amount that is administered in two or more doses or an amount that is administered chronically.

The term "nucleic acids," or "oligonucleotides," as used herein, refers to a polymer of nucleotides. As used herein, a "nucleotide" is given its ordinary meaning as used in the art, i.e., a molecule comprising a sugar moiety, a phosphate group, and a base (usually nitrogenous). Typically, the nucleotide comprises one or more bases connected to a sugar-phosphate backbone (a base connected only to a sugar moiety, without the phosphate group, is a "nucleoside"). The sugars within the nucleotide may be, for example, ribose sugars (a "ribonucleic acid," or "RNA"), or deoxyribose sugars (a "deoxyribonucleic acid," or "DNA"). In some cases, the polymer may comprise both ribose and deoxyribose sugars. Examples of bases include, but not limited to, the naturally-occurring bases (e.g., adenosine or "A," thymidine or "T," guanosine or "G," cytidine or "C," or uridine or "U"). In some cases, the polymer may also comprise nucleoside analogs (e.g., aracytidine, inosine, isoguanosine, nebularine, pseudouridine, 2,6-diaminopurine, 2-aminopurine, 2-thiothymidine, 3-deaza-5-azacytidine, 2'-deoxyuridine, 3-nitorpyrrole, 4-methylindole, 4-thiouridine, 4-thiothymidine, 2-aminoadenosine, 2-thiothymidine, 2-thiouridine, 5-bromocytidine, 5-iodouridine, inosine, 6-azauridine, 6-chloropurine, 7-deazaadenosine, 7-deazaguanosine, 8-azaadenosine, 8-azidoadenosine, benzimidazole, Ml-methyladenosine, pyrrolo-pyrimidine, 2-amino-6-chloropurine, 3-methyl adenosine, 5-propynylcytidine, 5-propynyluridine, 5-bromouridine, 5-fluorouridine, 5-methylcytidine, 7-deazaadenosine, 7-deazaguanosine, 8-oxoadenosine, 8-oxoguanosine, O(6)-methylguanine, 2-thiocytidine, etc.), chemically or biologically modified bases (e.g., methylated bases), intercalated bases, modified sugars (e.g., 2'-fluororibose, 2'-aminoribose, 2'-azidoribose, 2'-O-methylribose, L-enantiomeric nucleosides arabinose, hexose, etc.), modified phosphate entities (e.g., phosphorothioates or 5'-N-phosphoramidite linkages), and/or other naturally and non-naturally occurring bases substitutable into the polymer, including substituted and unsubstituted aromatic moieties. Other suitable base and/or polymer modifications are well-known to those of skill in the art. In some cases, the polynucleotide may include DNA, RNA, modified DNA, modified RNA, antisense oligonucleotides, expression plasmid systems, nucleotides, modified nucleotides, nucleosides, modified nucleosides, aptamers, intact genes, or combinations thereof. Other examples of polynucleotides include interfering RNA, natural or unnatural siRNAs, shRNAs, microRNAs, ribozymes, DNA plasmids, aptamers, antisense oligonucleotides, randomized oligonucleotides, or ribozymes.

Definitions of specific functional groups and chemical terms are described in more detail below. For purposes of this invention, the chemical elements are identified in accordance with the Periodic Table of the Elements, CAS version, *Handbook of Chemistry and Physics,* $75^{th}$ Ed., inside cover, and specific functional groups are generally defined as described therein. Additionally, general principles of organic chemistry, as well as specific functional moieties and reactivity, are described in *Organic Chemistry,* Thomas Sorrell, University Science Books, Sausalito: 1999, the entire contents of which are incorporated herein by reference.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "aliphatic" is used to indicate those aliphatic groups (cyclic, acyclic, substituted, unsubstituted, branched or unbranched) having 1-20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, nitrido, imino, thionitrido, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

As used herein, the term "alkyl" is given its ordinary meaning in the art and refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. In some cases, the alkyl group may be a lower alkyl group, i.e., an alkyl group having 1 to 10 carbon atoms (e.g., methyl, ethyl, propyl, butyl, pentyl, hexyl, heptyl, octyl, nonyl, or decyl). In some embodiments, a straight chain or branched chain alkyl may have 30 or fewer carbon atoms in its backbone, and, in some cases, 20 or fewer. In some embodiments, a straight chain or branched chain alkyl may have 12 or fewer carbon atoms in its backbone (e.g., $C_1$-$C_{12}$ for straight chain, $C_3$-$C_{12}$ for branched chain), 6 or fewer, or 4 or fewer. Likewise, cycloalkyls may have from 3-10 carbon atoms in their ring structure, or 5, 6 or 7 carbons in the ring structure. Examples of alkyl groups include, but are not limited to, methyl, ethyl, propyl, isopropyl, cyclopropyl, butyl, isobutyl, t-butyl, cyclobutyl, hexyl, and cyclohexyl.

The term "alkylene" as used herein refers to a bivalent alkyl group. An "alkylene" group is a polymethylene group, i.e., —$(CH_2)_z$—, wherein z is a positive integer, e.g., from 1 to 20, from 1 to 10, from 1 to 6, from 1 to 4, from 1 to 3, from 1 to 2, or from 2 to 3. A substituted alkylene chain is a polymethylene group in which one or more methylene hydrogen atoms are replaced with a substituent. Suitable substituents include those described herein for a substituted aliphatic group.

Generally, the suffix "-ene" is used to describe a bivalent group. Thus, any of the terms defined herein can be modified with the suffix "-ene" to describe a bivalent version of that moiety. For example, a bivalent carbocycle is "carbocyclylene", a bivalent aryl ring is "arylene", a bivalent benzene ring is "phenylene", a bivalent heterocycle is "heterocyclylene", a bivalent heteroaryl ring is "heteroarylene", a bivalent alkyl chain is "alkylene", a bivalent alkenyl chain is "alkenylene", a bivalent alkynyl chain is "alkynylene", a bivalent heteroalkyl chain is "heteroalkylene", a bivalent heteroalkenyl chain is "heteroalkenylene", a bivalent heteroalkynyl chain is "heteroalkynylene", and so forth.

The terms "alkenyl" and "alkynyl" are given their ordinary meaning in the art and refer to unsaturated aliphatic groups analogous in length and possible substitution to the alkyls described above, but that contain at least one double or triple bond respectively.

In certain embodiments, the alkyl, alkenyl and alkynyl groups employed in the invention contain 1-20 aliphatic carbon atoms. In certain other embodiments, the alkyl, alkenyl, and alkynyl groups employed in the invention contain 1-10 aliphatic carbon atoms. In yet other embodiments, the alkyl, alkenyl, and alkynyl groups employed in the invention contain 1-8 aliphatic carbon atoms. In still other embodiments, the alkyl, alkenyl, and alkynyl groups employed in the invention contain 1-6 aliphatic carbon atoms. In yet other embodiments, the alkyl, alkenyl, and alkynyl groups employed in the invention contain 1-4 carbon atoms. Illustrative aliphatic groups thus include, but are not limited to, for example, methyl, ethyl, n-propyl, isopropyl, allyl, n-butyl, sec-butyl, isobutyl, t-butyl, n-pentyl, sec-pentyl, isopentyl, t-pentyl, n-hexyl, sec-hexyl, moieties and the like, which again, may bear one or more substituents. Alkenyl groups include, but are not limited to, for example, ethenyl, propenyl, butenyl, 1-methyl-2-buten-1-yl, and the like. Representative alkynyl groups include, but are not limited to, ethynyl, 2-propynyl (propargyl), 1-propynyl and the like.

The term "cycloalkyl," as used herein, refers specifically to groups having three to ten, preferably three to seven carbon atoms. Suitable cycloalkyls include, but are not limited to cyclopropyl, cyclobutyl, cyclopentyl, cyclohexyl, cycloheptyl and the like, which, as in the case of other aliphatic, heteroaliphatic, or hetercyclic moieties, may optionally be substituted with substituents including, but not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —NO$_2$; —CN; —CF$_3$; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)$_2$R$_x$; —NR$_x$(CO)R$_x$, wherein each occurrence of R$_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "heteroaliphatic," as used herein, refers to an aliphatic moiety, as defined herein, which includes both saturated and unsaturated, nonaromatic, straight chain (i.e., unbranched), branched, acyclic, cyclic (i.e., heterocyclic), or polycyclic hydrocarbons, which are optionally substituted with one or more functional groups, and that contain one or more oxygen, sulfur, nitrogen, phosphorus, or silicon atoms, e.g., in place of carbon atoms. In certain embodiments, heteroaliphatic moieties are substituted by independent replacement of one or more of the hydrogen atoms thereon with one or more substituents. As will be appreciated by one of ordinary skill in the art, "heteroaliphatic" is intended herein to include, but is not limited to, heteroalkyl, heteroalkenyl, heteroalkynyl, heterocycloalkyl, heterocycloalkenyl, and heterocycloalkynyl moieties. Thus, the term "heteroaliphatic" includes the terms "heteroalkyl," "heteroalkenyl", "heteroalkynyl", and the like. Furthermore, as used herein, the terms "heteroalkyl", "heteroalkenyl", "heteroalkynyl", and the like encompass both substituted and unsubstituted groups. In certain embodiments, as used herein, "heteroaliphatic" is used to indicate those heteroaliphatic groups (cyclic, acyclic, substituted, unsubstituted, branched or unbranched) having 1-20 carbon atoms. Heteroaliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, sulfinyl, sulfonyl, nitrido, imino, thionitrido, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "heteroalkyl" is given its ordinary meaning in the art and refers to an alkyl group as described herein in which one or more carbon atoms is replaced by a heteroatom. Suitable heteroatoms include oxygen, sulfur, nitrogen, phosphorus, and the like. Examples of heteroalkyl groups include, but are not limited to, alkoxy, alkoxyalkyl, amino, thioester, poly(ethylene glycol), and alkyl-substituted amino.

The terms "heteroalkenyl" and "heteroalkynyl" are given their ordinary meaning in the art and refer to unsaturated aliphatic groups analogous in length and possible substitution to the heteroalkyls described above, but that contain at least one double or triple bond respectively.

Some examples of substituents of the above-described aliphatic (and other) moieties of compounds of the invention include, but are not limited to aliphatic; heteroaliphatic; aryl; heteroaryl; alkylaryl; alkylheteroaryl; alkoxy; aryloxy; heteroalkoxy; heteroaryloxy; alkylthio; arylthio; heteroalkylthio; heteroarylthio; F; Cl; Br; I; —OH; —NO$_2$; —CN; —CF$_3$; —CHF$_2$; —CH$_2$F; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; OCO$_2$R$_x$; —OCON(R$_x$)$_2$; —N(R$_x$)$_2$; —S(O)$_2$R$_x$; —NR$_x$(CO)R$_x$ wherein each occurrence of R$_x$ independently includes, but is not limited to, aliphatic, alycyclic, heteroaliphatic, heterocyclic, aryl, heteroaryl, alkylaryl, or alkylheteroaryl, wherein any of the aliphatic, heteroaliphatic, alkylaryl, or alkylheteroaryl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "aryl" is given its ordinary meaning in the art and refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls. The aryl group may be optionally substituted, as described herein. Substituents include, but are not limited to, any of the previously mentioned substituents, i.e., the substituents recited for aliphatic moieties, or for other moieties as disclosed herein, resulting in the formation of a stable compound. In some cases, an aryl group is a stable mono- or polycyclic unsaturated moiety having preferably 3-14 carbon atoms, each of which may be substituted or unsubstituted. "Carbocyclic aryl groups" refer to aryl groups wherein the ring atoms on the aromatic ring are carbon atoms. Carbocyclic aryl groups include monocyclic carbocyclic aryl groups and polycyclic or fused compounds (e.g., two or more adjacent ring atoms are common to two adjoining rings) such as naphthyl groups.

The terms "heteroaryl" is given its ordinary meaning in the art and refers to aryl groups comprising at least one heteroatom as a ring atom. A "heteroaryl" is a stable heterocyclic or polyheterocyclic unsaturated moiety having preferably 3-14 carbon atoms, each of which may be substituted or unsubstituted. Substituents include, but are not limited to, any of the previously mentioned substituents, i.e., the substitutes recited for aliphatic moieties, or for other moieties as disclosed herein, resulting in the formation of a stable compound. In some cases, a heteroaryl is a cyclic aromatic radical having from five to ten ring atoms of which one ring atom is selected from S, O, and N; zero, one, or two ring atoms are additional heteroatoms independently selected from S, O, and N; and the remaining ring atoms are carbon, the radical being joined to the rest of the molecule via any of the ring atoms, such as, for example, pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

It will also be appreciated that aryl and heteroaryl moieties, as defined herein may be attached via an alkyl or heteroalkyl moiety and thus also include -(alkyl)aryl, -(heteroalkyl)aryl, -(heteroalkyl)heteroaryl, and -(heteroalkyl) heteroaryl moieties. Thus, as used herein, the phrases "aryl or heteroaryl moieties" and "aryl, heteroaryl, -(alkyl)aryl, -(heteroalkyl)aryl, -(heteroalkyl)heteroaryl, and -(heteroalkyl)heteroaryl" are interchangeable. Substituents include, but are not limited to, any of the previously mentioned substituents, i.e., the substituents recited for aliphatic moieties, or for other moieties as disclosed herein, resulting in the formation of a stable compound.

It will be appreciated that aryl and heteroaryl groups (including bicyclic aryl groups) can be unsubstituted or substituted, wherein substitution includes replacement of one or more of the hydrogen atoms thereon independently with any one or more of the following moieties including, but not limited to: aliphatic; alicyclic; heteroaliphatic; heterocyclic; aromatic; heteroaromatic; aryl; heteroaryl; alkylaryl; heteroalkylaryl; alkylheteroaryl; heteroalkylheteroaryl; alkoxy; aryloxy; heteroalkoxy; heteroaryloxy; alkylthio; arylthio; heteroalkylthio; heteroarylthio; F; Cl; Br; I; —OH; —NO$_2$; —CN; —CF$_3$; —CH$_2$F; —CHF$_2$; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$^x$); —CON(R$_x$)$_2$; —OC(O)R$_x$; —OCO$_2$R$^x$; —OCON(R$_x$)$_2$; —N(R$_x$)$_2$; —S(O)R$_x$; —S(O)$_2$R$_x$; —N$_x$(CO)R$_x$ wherein each occurrence of R$_x$ independently includes, but is not limited to, aliphatic, alicyclic, heteroaliphatic, heterocyclic, aromatic, heteroaromatic, aryl, heteroaryl, alkylaryl, alkylheteroaryl, heteroalkylaryl or heteroalkylheteroaryl, wherein any of the aliphatic, alicyclic, heteroaliphatic, heterocyclic, alkylaryl, or alkylheteroaryl substituents described above and herein may be substituted or unsubstituted, branched or unbranched, saturated or unsaturated, and wherein any of the aromatic, heteroaromatic, aryl, heteroaryl, -(alkyl)aryl or -(alkyl)heteroaryl substituents described above and herein may be substituted or unsubstituted. Additionally, it will be appreciated, that any two adjacent groups taken together may represent a 4, 5, 6, or 7-membered substituted or unsubstituted alicyclic or heterocyclic moiety. Additional examples of generally applicable substituents are illustrated by the specific embodiments described herein.

The terms "halo", "halide", and "halogen" as used herein refer to an atom selected from the group consisting of fluorine, chlorine, bromine, and iodine.

It will be appreciated that the above groups and/or compounds, as described herein, may be optionally substituted with any number of substituents or functional moieties. That is, any of the above groups may be optionally substituted. As used herein, the term "substituted" is contemplated to include all permissible substituents of organic compounds, "permissible" being in the context of the chemical rules of valence known to those of ordinary skill in the art. In general, the term "substituted" whether preceded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Furthermore, this invention is not intended to be limited in any manner by the permissible substituents of organic compounds. The term "stable," as used herein, preferably refers to compounds which possess stability sufficient to allow manufacture and which maintain the integrity of the compound for a sufficient period of time to be detected and preferably for a sufficient period of time to be useful for the purposes detailed herein.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF$_3$, —CN, aryl, aryloxy, perhaloalkoxy, aralkoxy, heteroaryl, heteroaryloxy, heteroarylalkyl, heteroaralkoxy, azido, amino, halide, alkylthio, nitrido, acylalkyl, carboxy esters, -carboxamido, acyloxy, aminoalkyl, alkylaminoaryl, alkylaryl, alkylaminoalkyl, alkoxyaryl, arylamino, aralkylamino, alkylsulfonyl, -carboxamidoalkylaryl, -carboxamidoaryl, hydroxyalkyl, haloalkyl, alkylaminoalkylcarboxy-, aminocarboxamidoalkyl-, cyano, alkoxyalkyl, perhaloalkyl, arylalkyloxyalkyl, and the like.

The following examples are intended to illustrate certain embodiments of the present invention, but do not exemplify the full scope of the invention.

EXAMPLES

These examples describe the anticancer properties of osmium(VI) nitrido compounds bearing bidentate ligands in which small changes to the ligand periphery evoke completely different cellular responses. The cellular response evoked by anti-proliferating osmium(VI) nitrido compounds of general formula OsN(NˆN)Cl$_3$ (NˆN=2,2'-bipyridine 1, 1,10-phenanthroline 2, 3,4,7,8-tetramethyl-1,10-phenanthroline 3, or 4,7-diphenyl-1,10-phenanthroline 4) were tuned by subtle ligand modifications. Complex 2 induced DNA damage, resulting in activation of the p53 pathway, cell cycle arrest at the G2/M phase, and caspase-dependent apoptotic cell death. In contrast, 4 evoked ER stress leading to the upregulation of proteins of the unfolded protein response pathway, increase in ER size, and p53-independent apoptotic cell death.

The antiproliferative activity of cisplatin created a new paradigm in the field of anticancer drugs. The platinum-based drugs cisplatin, carboplatin, and oxaliplatin now make up the first line of defense against many systemic malignancies. Drawbacks associated with platinum therapy, such as acquired or inherent resistance, toxic side effects, and tumor recurrence after initial treatment, have prompted researchers to investigate alternative transition metal-based anticancer drugs. Ruthenium and titanium compounds have undergone clinical trials and much time has been devoted to understanding their mechanisms of action. In contrast, the anticancer properties of Os-containing compounds are relatively unexplored, perhaps because of the reputation of osmium as being highly toxic.

Example 1

The complexes investigated in Examples 1-3 are depicted in Scheme 1.

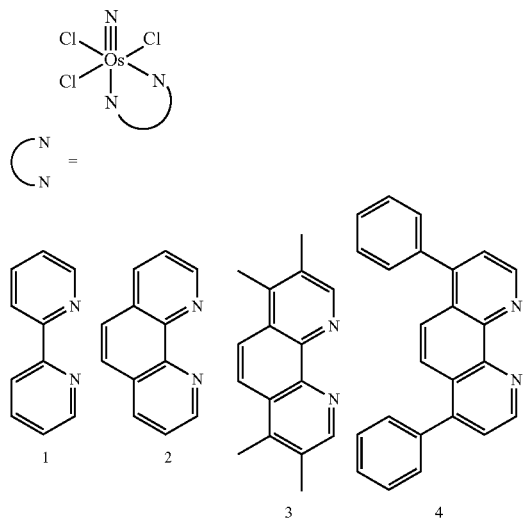

Scheme 1 Structures of osmium (VI) nitrodo complexes.

The bidentate ligands used were 2,2'-bipyridine, 1,10-phenanthroline, 3,4,7,8-tetramethyl-1,10-phenanthroline, and 4,7-diphenyl-1,10-phenanthroline. The complexes were synthesized by reacting $(Bu_4N)[OsNCl_4]$ with the appropriate ligand in acetone or dichloromethane. Characterization of 1-4 and the crystal structure of 4 are reported in Example 4. Prior to carrying out cellular studies, the stability of 2, taken as a representative member of the family, in phosphate buffered saline (PBS) and DMEM cell culture media was established by UV-vis spectroscopy. Its thermal stability was demonstrated by variable temperature $^1H$ NMR spectroscopy. The water-octanol coefficient (log P) for each compound was also determined. Compound 1 had a log P of 0.71, compound 2 had a log P of 1.26, compound 3 had a log P of 1.54, and compound 4 had a log P of 1.84.

The anti-proliferative properties of 1-4 against a panel of human cancer cell lines were assessed by the MTT [3-(4,5-dimethylthiazol-2-yl)-2,5-diphenyltetrazolium bromide] assay. Cisplatin was included as a control. The $IC_{50}$ values, concentrations required to induce 50% viability, were derived from dose-response curves and are summarized in Table 1.

TABLE 1

$IC_{50}$ values (in µM) of osmium complexes 1-4 against a panel of human cell lines.

| Complex | A549 (lung) | HeLa (cervical) | A2780 (ovarian) | A2780/CP70 (ovarian) | MRC-5 (lung normal) |
|---|---|---|---|---|---|
| 1 | 6.11 ± 0.87 | 9.24 ± 0.58 | 3.80 ± 0.21 | 3.94 ± 1.75 | 21.57 ± 4.85 |
| 2 | 7.86 ± 1.41 | 6.95 ± 0.53 | 1.99 ± 0.23 | 2.96 ± 0.23 | 16.59 ± 3.61 |
| 3 | 14.89 ± 1.63 | 6.34 ± 0.52 | 7.97 ± 1.41 | 3.91 ± 0.26 | 17.19 ± 2.16 |
| 4 | 1.97 ± 0.02 | 2.86 ± 0.51 | 3.36 ± 0.09 | 3.40 ± 0.28 | 8.45 ± 1.21 |
| cisplatin | 3.59 ± 0.92 | 2.83 ± 0.06 | 1.41 ± 0.37 | 10.28 ± 1.50 | 11.14 ± 1.33 |

The complexes all displayed micromolar toxicities comparable to, and in some cases, better than that of cisplatin. Compounds 2 and 4 were the most potent osmium(VI) compounds investigated in vitro to date. None of the Os complexes exhibited cross-resistance with cisplatin, as shown by their ability to indiscriminately kill cisplatin-sensitive and -resistant ovarian cancer cell lines, A2780 and A2780CP70. As a measure of therapeutic potential, cytotoxicity studies were conducted with healthy lung fibroblast MRC5 cell. In general 1-4 were less potent toward MRC5, indicating selective toxicity for cancerous over healthy cells. Notably, 2 displayed an 8-fold higher potency for the ovarian cancer cell line A2780 than for the normal lung fibroblast, MRC5 cell line.

Figure 5:
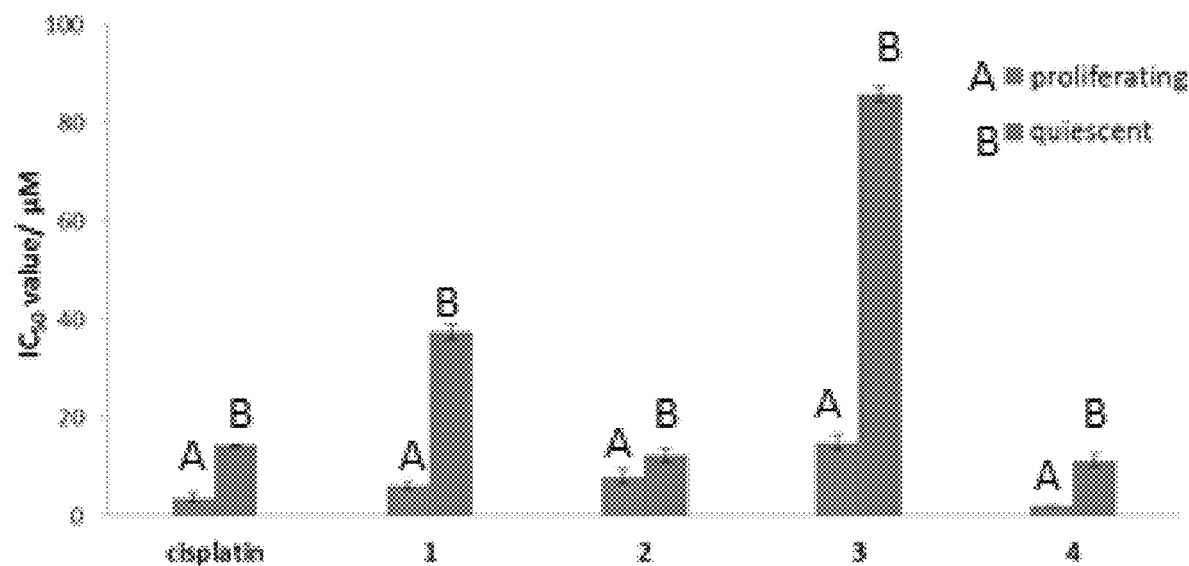
FIG. 5 shows a graph of IC$_{50}$ values (in μM) of compounds [OsN(bpy))Cl$_3$](1), [OsN(phen))Cl$_3$](2), [OsN(tmphen))Cl$_3$](3), and [OsN(bathophen))Cl$_3$](4) against A549 cells grown under proliferating and non-proliferating conditions, according to some embodiments.

Cell viability studies were also carried out with quiescent A549 lung cancer cells. Proliferating cells had the following distribution: G1: 70.3%, S: 26.5%, and G2/M: 3.1%. Non-proliferating cells had the following distribution: G1: 82.5%, S: 17.0%, and G2/M: 0.5%. Comparison of the $IC_{50}$ values for quiescent and proliferating A549 cells revealed that 1-4 selectively targeted the latter is shown in FIG. 5.

Figure 6:
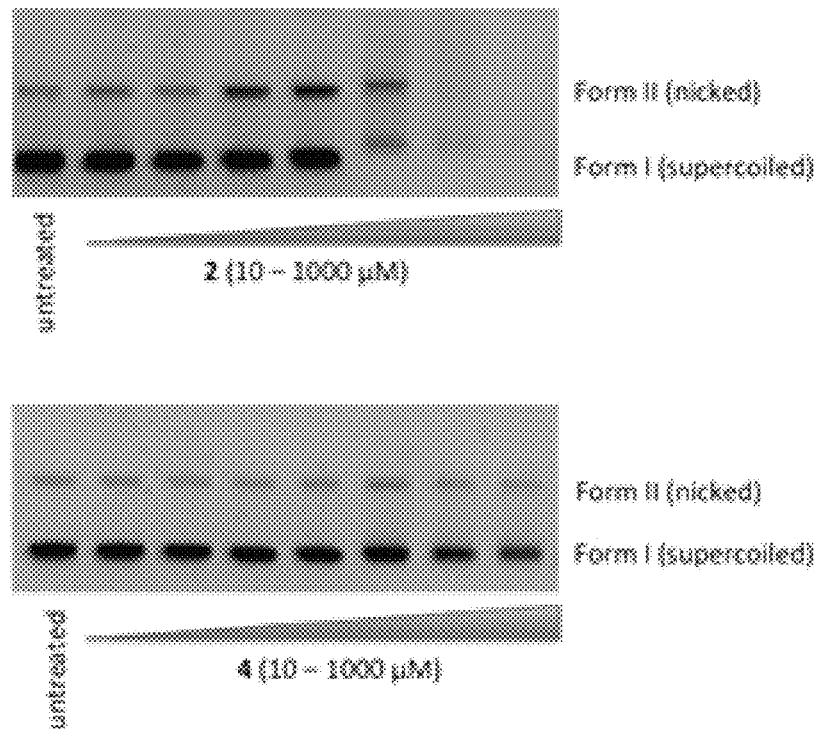
FIG. 6 shows an image of an agarose gel electrophoresis of pUC19 DNA treated with [OsN(phen))Cl$_3$] and [OsN(bathophen))Cl$_3$] after 24 hours incubation at 37° C.
Figure 7:
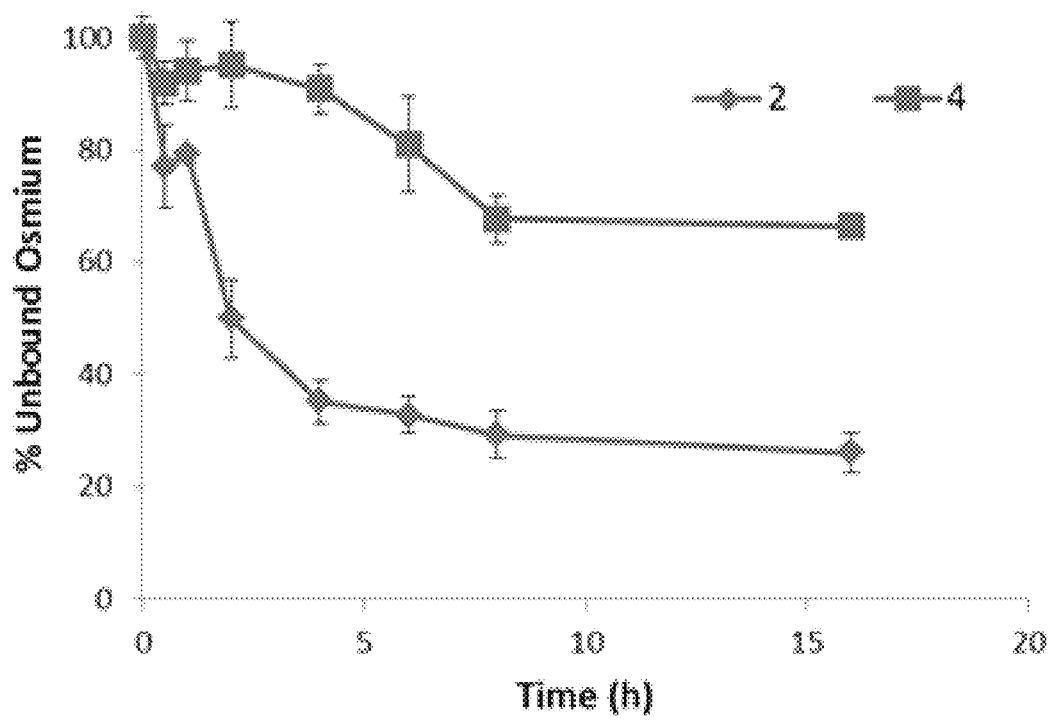
FIG. 7 shows a graph of the percentage of unbound osmium at various time points after exposure to [OsN(phen))Cl$_3$](2) and [OsN(bathophen))Cl$_3$] (4) both at 25 μM to 250 μM of ct-DNA, according to some embodiments.

The osmium compounds were hypothesized to induce cell death through DNA interactions. Therefore, the interaction of 2 or 4 with pUC19 plasmid DNA was investigated using gel electrophoresis; the results of which are as shown in FIG. 6. As the concentration of 2 increased, there was a clear increase in the amount of nicked circular, and a concomitant decrease in the amount of supercoiled, plasmid DNA. At concentrations >250 µM, the bands in the gel smeared and then disappeared. Surprisingly, 4 had no visible effect on the migration pattern of pUC19 DNA. The gel images clearly indicated that 2 induced conformational changes and degradation of circular DNA whereas 4 had no such effect. The DNA binding kinetics of 2 and 4 were studied by measuring the amount of osmium bound to precipitated ct-DNA; the results of which are as shown in FIG. 7. The half-life of this reaction for 2 was 2 hours. The half-life for 4 could not be calculated because a large portion remained unbound after 16-hours incubation. These results illustrated the differing DNA-binding abilities of 2 and 4.

Example 2

Figure 2A:
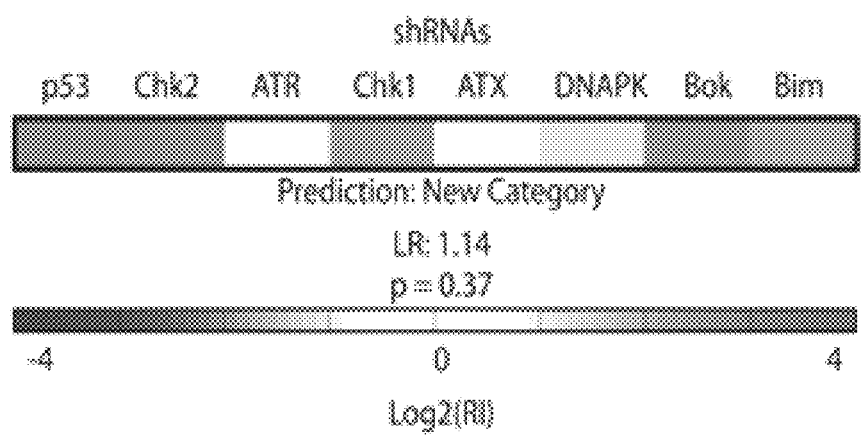
FIGS. 2A-2B show RNAi signatures derived from the treatment of Eμ-Mycp19arf–/– lymphoma cells with (A) [OsN(phen)Cl$_3$] (2) and (B) [OsN(bathophen)Cl$_3$] (4), according to some embodiments.
Figure 2B:
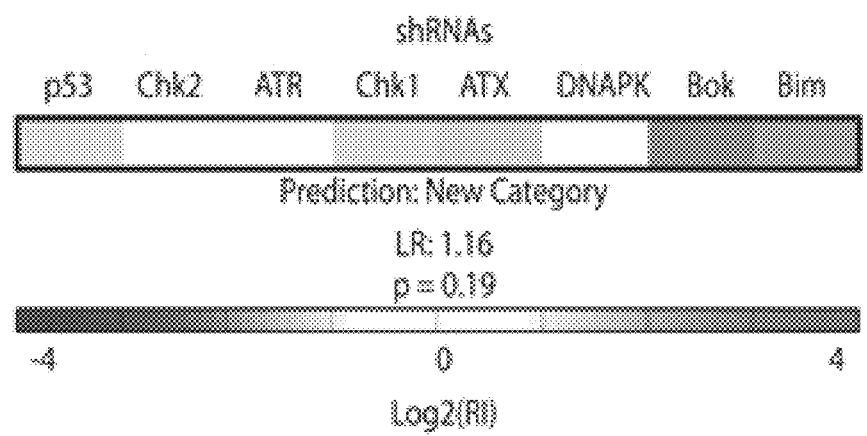

This example described the intracellular mechanism of non-limiting osmium compounds. To determine how the osmium compounds behave intracellularly, the most active compounds 2 and 4 were analyzed using a recently developed strategy whereby RNAi was used to classify the mechanism of cytotoxic drug action. This RNAi-based methodology relied on a fluorescence competition assay involving lymphoma cells that were partially infected with one of eight distinct short hairpin RNAs (shRNAs). shRNA-bearing cells will either enrich or deplete relative to the uninfected population based on drug survival advantage or disadvantage conferred by a given shRNA. The responses of these cells comprise signatures, which have been obtained for all classes of clinically used cytotoxic agents. The signature of a novel compound was compared to those of a reference set of drugs using a probabilistic K-nearest neighbors algorithm to determine whether it belonged to a class in the reference set or a new category that was not represented in the reference set. RNAi signatures derived from the treatment of Eµ-Mycp19arf–/– lymphoma cells with (A) [OsN(phen))Cl$_3$] and (B) [OsN(bathophen))Cl$_3$] at the LD80-90 concentration for each compound are shown in FIGS. 2A-B.

Interestingly, neither 2 nor 4 classified as belonging to any category of drug mechanism present in the reference set and thus represented novel mechanisms of drug action. The proposed mechanism of action is shown in FIG. 4. Individual shRNA responses did, however, give clues about broader mechanistic aspects of action. For instance, all DNA-damaging drugs in the reference set had a roughly 1:1 log 2(RI) shp53:shChk2 ratio with the two values being over 3.0. For 2, however, shp53 and shChk2 values were 2.7 and 2.6, respectively, indicating that DNA damage may be a part of a pleiotropic mechanism of 2 induced cell death. Conversely, for 4, shp53 and shChk2 values of 1.32 and 0.73, respectively, indicated that this compound did not kill cells by damaging DNA.

Figure 8:
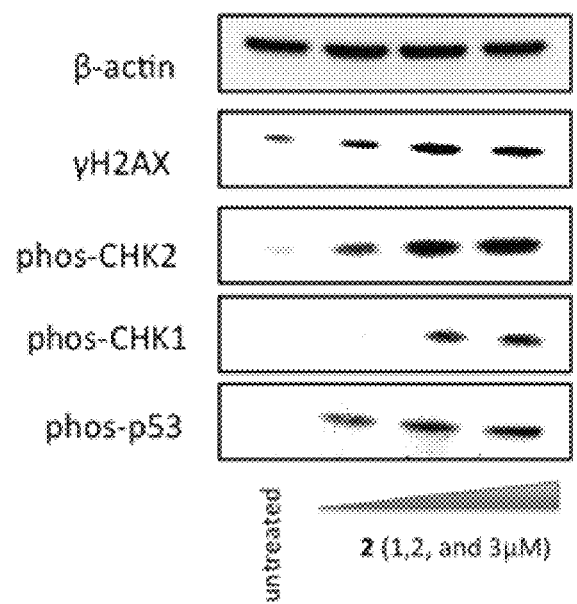
FIG. 8 shows a western blot of proteins related to the DNA damage pathway, according to some embodiments.

To gain further insight into the modes of action of 2 and 4, immunoblotting analyses were conducted to monitor changes in expression of biomarkers related to the DNA damage pathway (FIG. 8). A2780 cells incubated for 72 hours with 2 showed a marked increase in expression of the phosphorylated forms of H2AX (γH2AX), CHK2, CHK1, and p53 (Ser15), indicative of DNA damage. In contrast, cells treated with 4 displayed little signs of DNA damage. Additionally upon extraction of genomic DNA from A2780 cells, significantly higher levels of osmium were detected in samples dosed with 2 as compared to 4. Complex 2 had a ratio of about 21 Os/DNA (pmol/µg) and Complex 4 had a ratio about 14 Os/DNA (pmol/µg). Taken together the results indicated that, in cells, 2 targets DNA more readily than 4. This difference could be related to steric effects imposed by the phenyl groups in 4.

Figure 3:
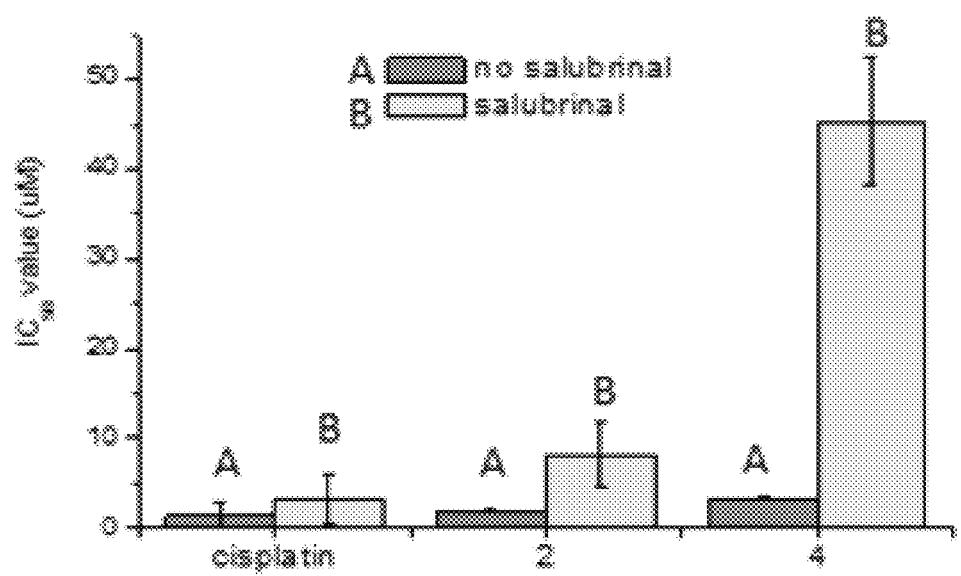
FIG. 3 shows a graph of the IC$_{50}$ values of cisplatin, [OsN(phen)Cl$_3$] (2), and [OsN(bathophen)Cl$_3$] (4) in the absence and presence of ER stress inhibitor, salubrinal, and fluorescence microscopy images of live A2780 cells incubated at 37° C. for 4 hours, according to some embodiments.
Figure 9:
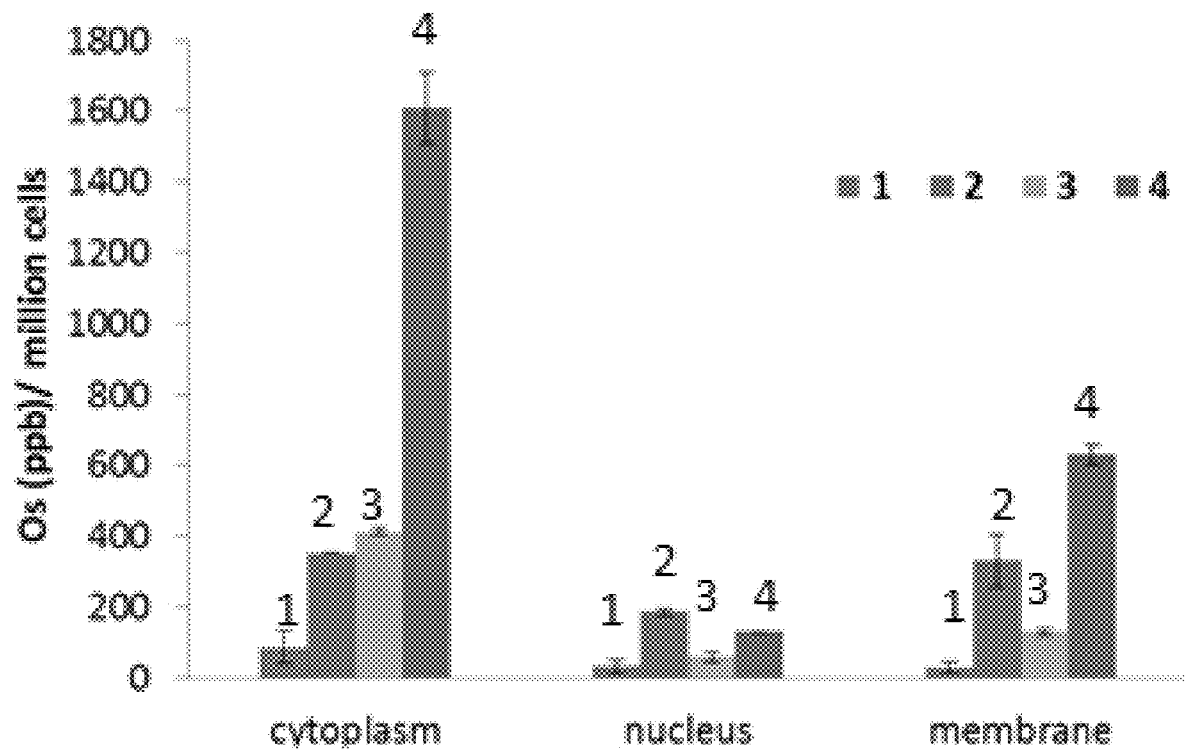
FIG. 9 shows a graph of osmium content in cytoplasm, nucleus, and membrane fractions isolated from A2780 cell treated with [OsN(bpy))Cl₃] (1), [OsN(phen))Cl₃] (2), [OsN (tmphen))Cl₃] (3), and [OsN(bathophen))Cl₃] (4), according to some embodiments.
Figure 10:
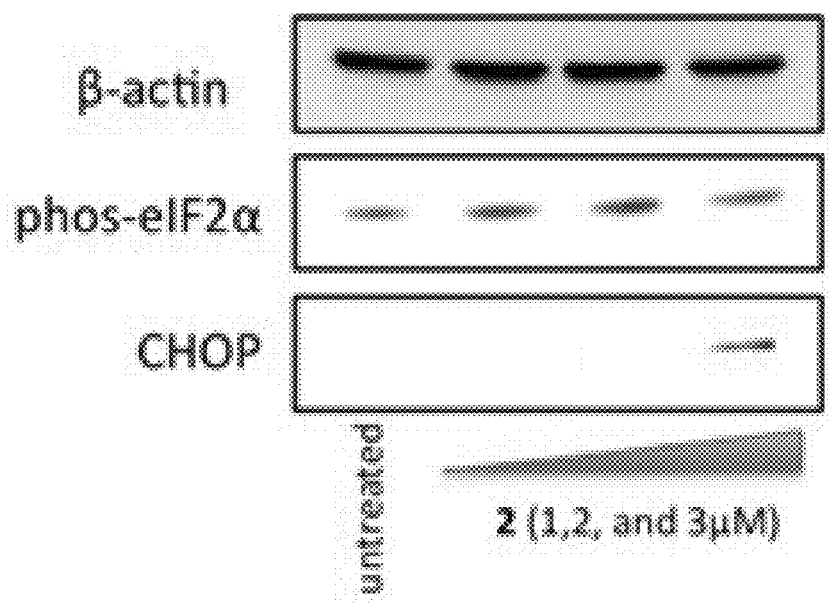
FIG. 10 shows a western blot of proteins related to the unfolded protein response pathway extracted from cells treated with [OsN(phen))Cl₃], according to some embodiments.
Figure 11:
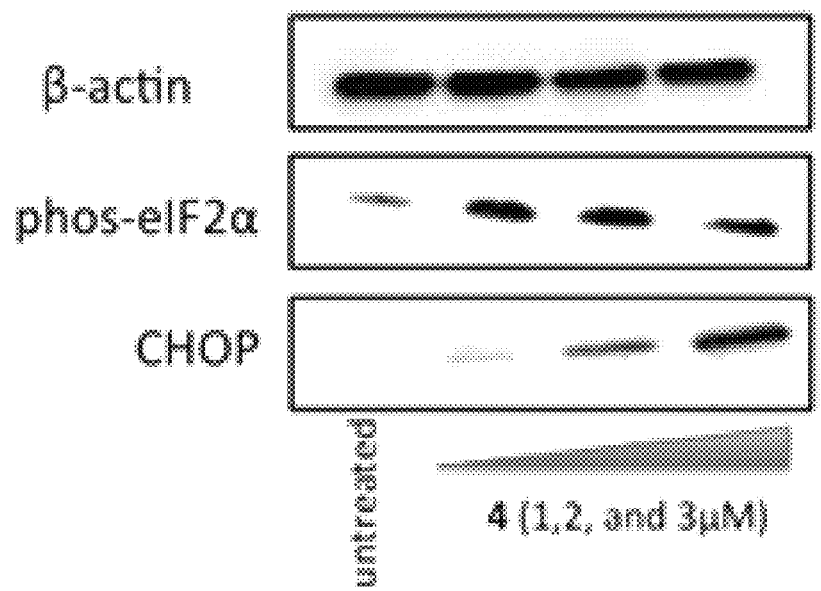
FIG. 11 shows a western blot of proteins related to the unfolded protein response pathway extracted from cells treated with [OsN(bathophen))Cl₃], according to some embodiments.

Cellular uptake studies revealed that 2 localized essentially evenly between the nucleus and cytoplasm. See FIG. 9. Complex 4, on the other hand, was predominantly found in the cytoplasm, at levels 12-fold higher than in the nucleus. This finding led to the investigation of the possibility that 4 may induce endoplasmic reticulum (ER) stress. Co-administration of 4 and salubrinal (10 µM), a known ER stress inhibitor, reduced the cytotoxicity of 4 in A2780 cells. The IC$_{50}$ value increased 13.3-fold compared to treatment with 4 alone, as shown in FIG. 3A, suggesting ER stress as a component of the cytotoxic mechanism of 4. Salubrinal had limited effect on the toxicity of DNA-targeting compounds like 2 and cisplatin. To further validate the ER as the main target for 4, the expression of proteins related to the unfolded protein response (UPR) was monitored. Upon incubation of A2780 cells with 4 for 72 hours, phosphorylated eukaryotic initiation factor 2α (eIF2α) and C/EBP homologous protein (CHOP) were upregulated, indicative of ER stress (FIGS. 10-11). Notably, 2 had little effect on eIF2α and CHOP expression. ER membrane expansion is widely associated with ER stress. With this fact in mind the ER size of A2780 cells upon incubation with 4 were examined using fluorescence microscopy. Relative to untreated controls (FIG. 3B), cells exposed to 4 (10 µM) for 4 h had 25.1% larger ER coverage (FIG. 3C). The ER size relative to the whole cell of the untreated controls was about 30% and the ER size relative to the whole cell of the treated samples was about 55%. These results clearly show that 4 targeted the ER and induced ER stress.

Figure 12:
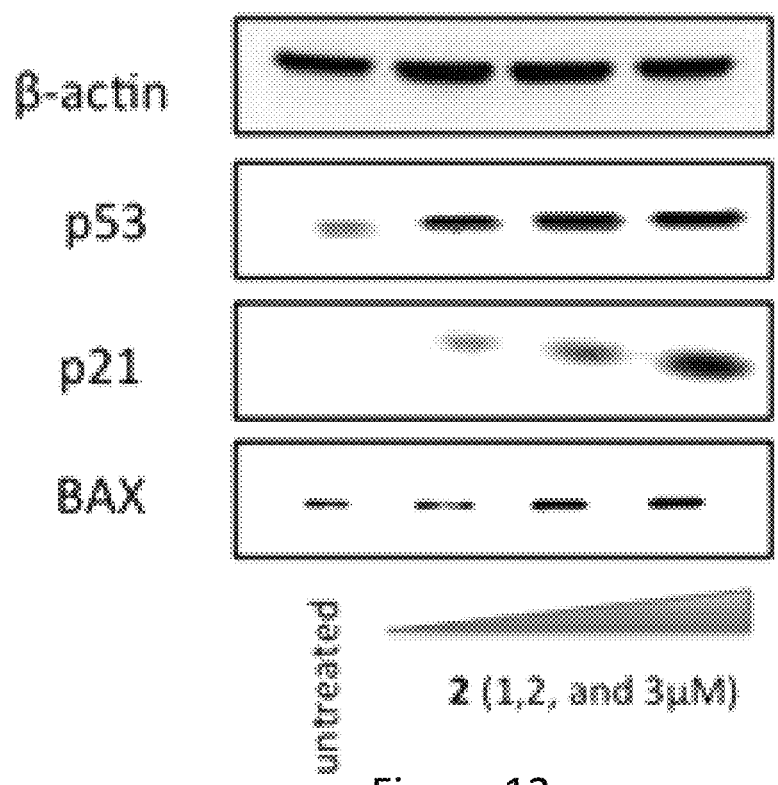
FIG. 12 shows a western blot of proteins related to the p53 pathway extracted from cells treated with [OsN(phen))Cl₃], according to some embodiments.
Figure 13:
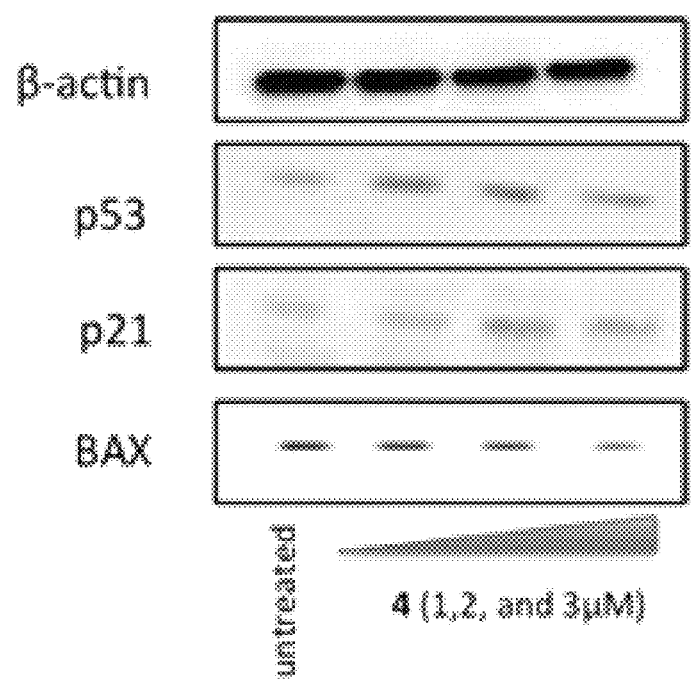
FIG. 13 shows a western blot of proteins related to the p53 pathway extracted from cells treated with [OsN(bathophen)) Cl₃], according to some embodiments.

Having established the intracellular targets of 2 and 4, the role of p53, a cell cycle and apoptosis regulator, in the cellular responses evoked was investigated. A2780 cells treated with 2 displayed higher p53 expression compared to untreated cells (FIG. 12). A dose-dependent increase in the downstream effectors p21 and BAX was also observed (FIG. 10). Therefore, p53 played a fundamental role in coordinating the cellular response to 2-induced DNA damage. However, p53 expression did not increase markedly upon incubation with 4. (FIG. 13). Additionally, BAX and p21 expression remained fairly constant (FIG. 13), indicating that p53 was not a major determinant in the cellular response induced by 4. To relate p53 to potency, cytotoxicity studies were conducted in the presence of p53 inhibitors pifithrin-α and pifithrin-µ. (both 10 µM). The IC$_{50}$ value for 2 increased significantly in the presence of either p53 inhibitor, suggesting p53-dependent cell death. The IC$_{50}$ values of compound 2 in the absence and presence of p53 inhibitor pifithrin-α after 72 hours incubation was about 4.5 µM and about 2 µM, respectively. The IC$_{50}$ values of compound 2 in the absence and presence of p53 inhibitor pifithrin-µ after 72 hours incubation was about 2 µM and about 30 µM, respectively.

Conversely, the toxicity profile of 4 was unaffected by the p53 inhibitors. Compounds capable of inducing cell death independent of p53 status are clinically desirable because p53 is associated with tumorigenesis and is inactivated in many cancers.

DNA flow cytometric analysis revealed that 2 stalled the cell cycle at the G2/M phase in a time-dependent manner (~3-fold increase in G2/M population after 72 h incubation). After 24 hours untreated A2780 cells had the following distribution: G1: 73.4%, S: 21.7%, and G2/M: 5.0%. After 48 hours untreated A2780 cells had the following distribution: G1: 75.1%, S: 19.6%, and G2/M: 5.2%. After 72 hours untreated had the following distribution: G1: 73.6%, S: 21.0%, and G2/M: 5.4%. After 24 hours A2780 cells treated with 2 had the following distribution: G1: 61.0%, S: 27.9%, and G2/M: 11.1%. After 48 hours A2780 cells treated with 2: G1: 61.8%, S: 19.0%, and G2/M: 19.1%. After 72 hours A2780 cells treated with 2 had the following distribution: G1: 57.3%, S: 23.3%, and G2/M: 19.4%. This property may be related to upregulation of p53 and phosphorylation of CHK1. Complex 4 induced relatively small perturbations to the cell cycle; changes in phase populations remained <5% even after a 72-hours incubation. After 24 hours untreated A2780 cells had the following distribution: G1: 73.7%, S: 23.1%, and G2/M: 3.3%. After 48 hours untreated A2780 cells had the following distribution: G1: 73.4%, S: 21.7%, and G2/M: 4.9%. After 72 hours untreated A2780 cells had the following distribution: G1: 79.7%, S: 19.4%, and G2/M: 0.9%. After 24 hours A2780 cells treated with 4 had the following distribution: G1: 70.9%, S: 24.8%, and G2/M: 4.6%. After 48 hours A2780 cells treated with 4 had the following distribution: G1: 71.9%, S: 18.3%, and G2/M: 9.8%. After 72 hours A2780 cells treated with 4 had the following distribution: G1: 70.3%, S: 24.4%, and G2/M: 5.3%.

Figure 14:
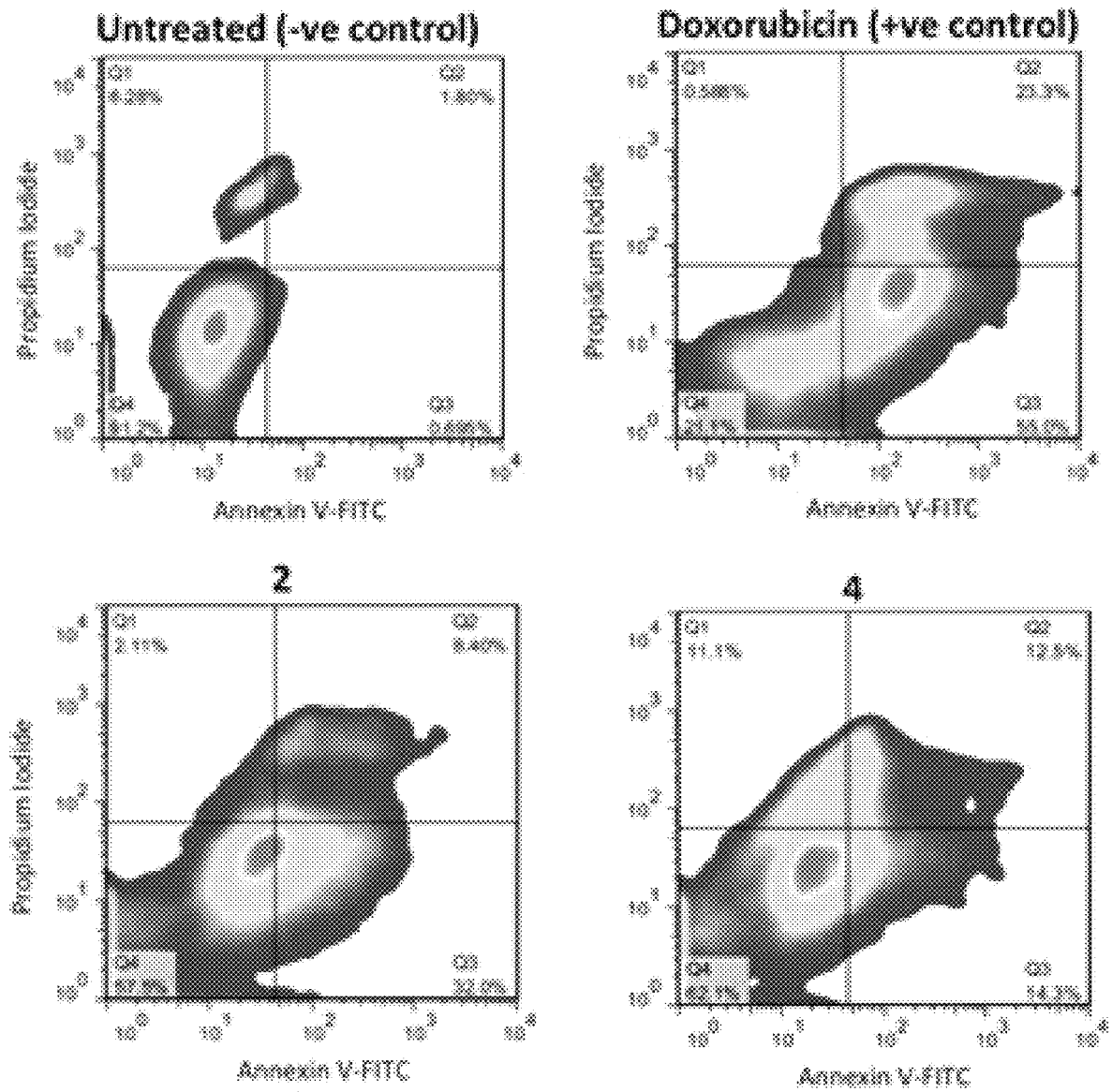
FIG. 14 shows FITC Annexin V/PI binding assay plots of untreated cells (negative control), cells treated with doxorubicin, [OsN(phen))Cl₃] (2) (3 μM for 72 hours) and [OsN(bathophen))Cl₃](4), according to some embodiments.
Figure 15:
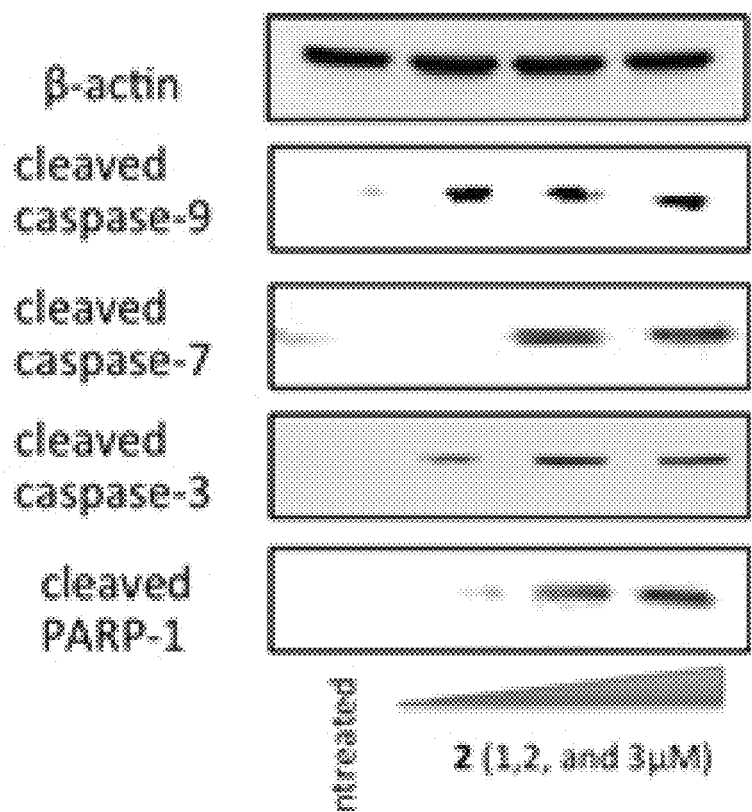
FIG. 15 shows a western blot of proteins related to the apoptosis pathway extracted from cells treated with [OsN (phen))Cl₃], according to some embodiments.
Figure 16:
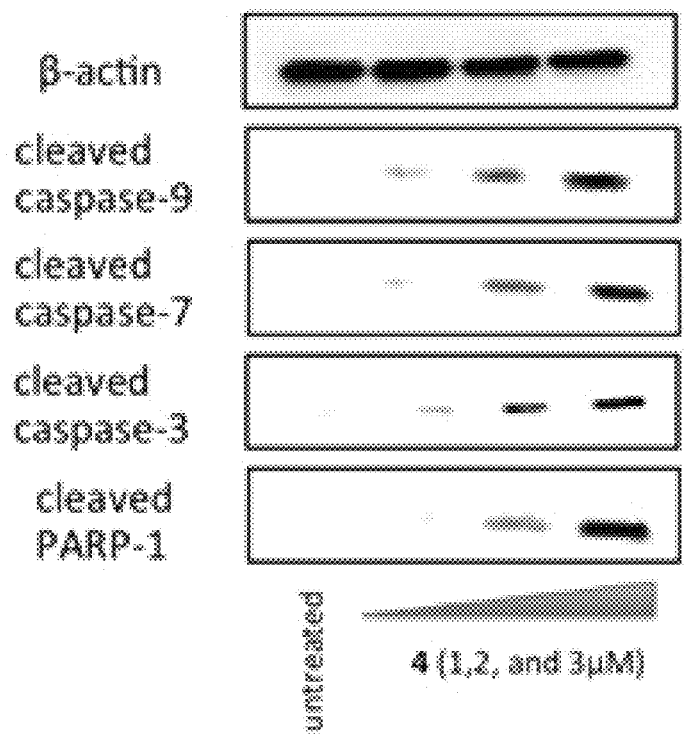
FIG. 16 shows a western blot of proteins related to the apoptosis pathway extracted from cells treated with [OsN (bathophen))Cl₃], according to some embodiments.

To have a more complete understanding of the cellular response induced by 2 or 4, their mode of cell killing was evaluated. Many clinically approved cancer drugs exert their cytotoxic effects through apoptosis, and so the features related to this pathway were monitored. Apoptotic cells underwent morphological changes that lead to cell membrane disorientation. This process resulted in the translocation of phosphatidylserine residues to the membrane exterior, which were be detected by Annexin V. Using a dual Annexin V staining/PI flow cytometry assay, the occurrence of apoptosis in A2780 cells treated for 72 hours with 2 or 4 was explored (FIG. 14). Both osmium complexes induced large populations of cells to undergo early and late stage apoptosis. Immunoblotting studies revealed that cells treated with 2 or 4 expressed apoptosis positive proteins, cleaved caspase 3, 7, 9, and poly ADP ribose polymerase (PARP) (FIGS. 15-16). These results provided validation for the apoptosis pathway. Cells can undergo other forms of cell death such as necrosis and autophagy. To probe these pathways, cytotoxicity assays were carried out in the presence of necrosis and autophagy inhibitors, chloroquine, and IM-54, respectively. Because both chloroquine and IM-54 had little effect on the potency of either of the osmium complexes, necrosis and autophagy were ruled out as possible death pathways. Overall the cellular data showed that 2 induced DNA damage which leads to G2/M phase arrest and apoptosis. On the other hand, 4 initiated ER stress, culminating in p53 independent, caspase directed apoptosis (FIG. 4).

Example 3

This example describes the selectivity of non-limiting compounds of Formula (I) toward cancer stem cells (CSCs).

Figure 17A:
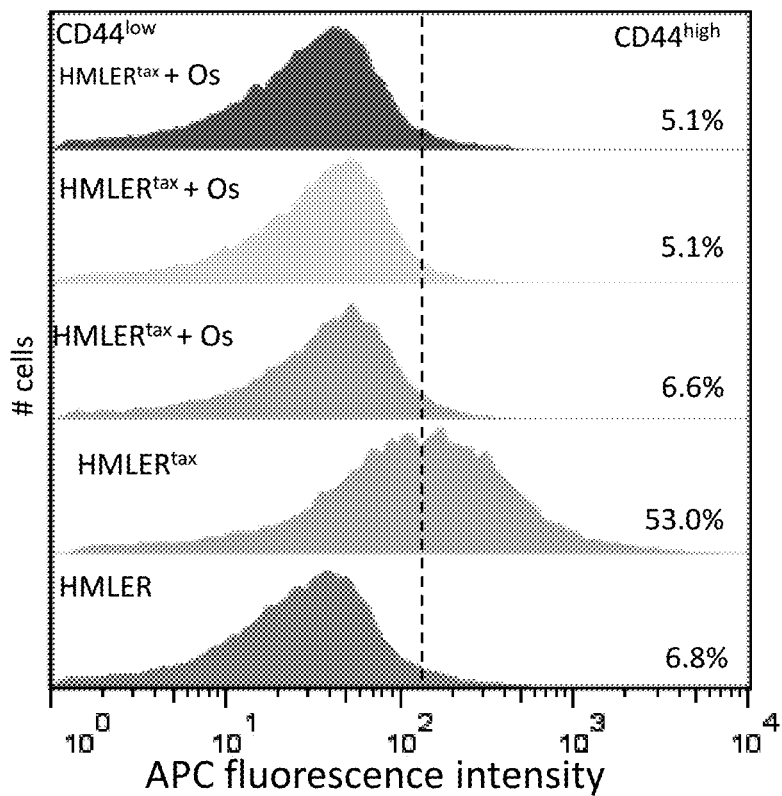
FIGS. 17A-17B shows graph of (A) HMLER and HMLER$^{tax}$ cell population and (B) viability after treatment with OsN(phen)Cl₃, according to some embodiments.
Figure 17B:
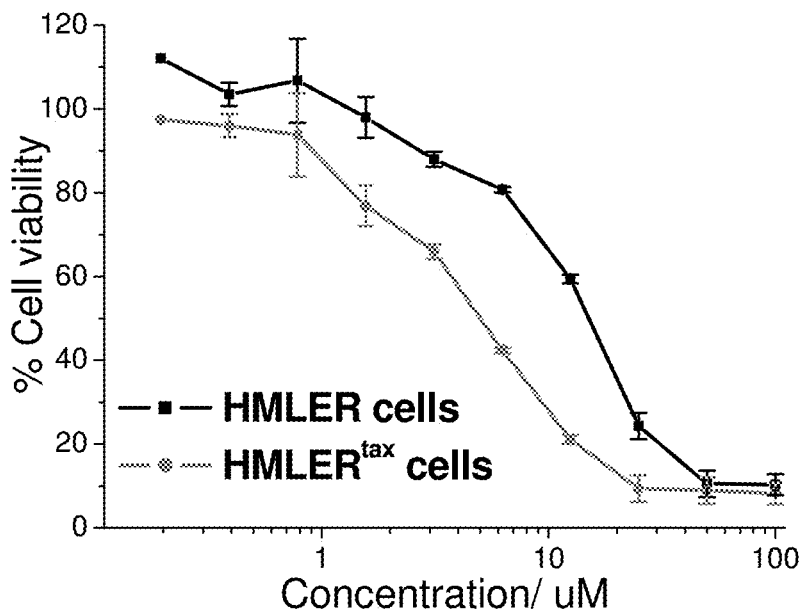
Figure 18:
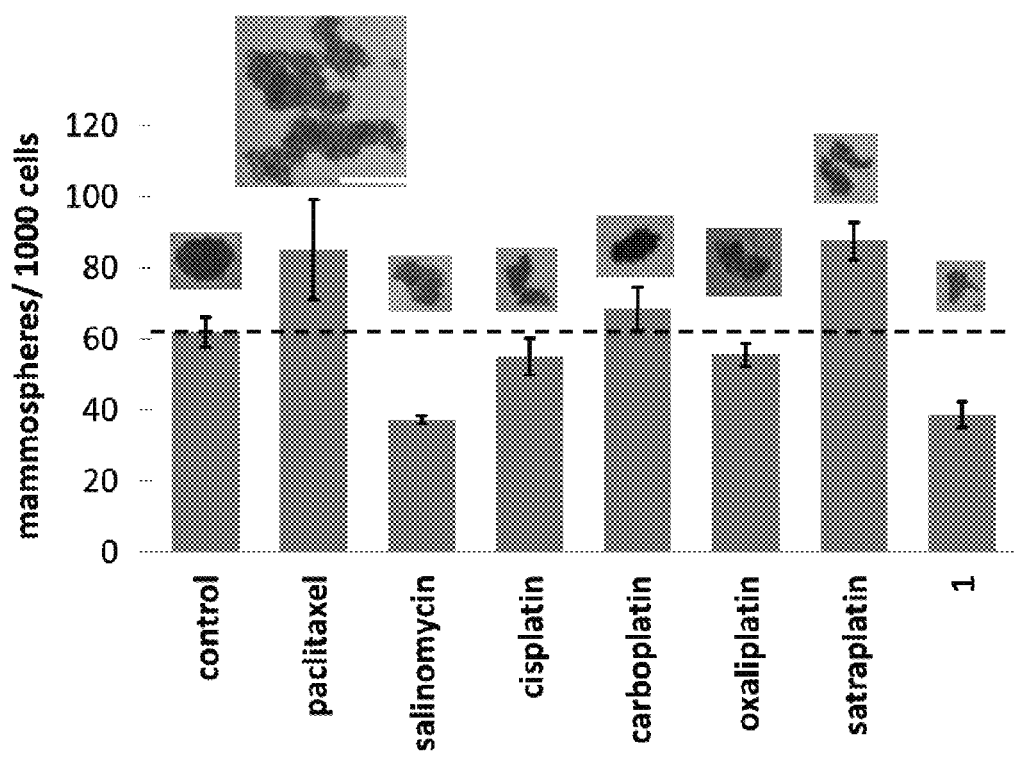
FIG. 18 shows a graph of HMLER mammospheres per 1000 cells after treatment with paclitaxel, salinomycin, cisplatin, carboplatin, oxaliplatin, satraplatin, and [OsN(bpy))Cl₃] and images of the mammospheres produced with each drug, according to some embodiments.

Cancer relapse is strongly linked to the existence of CSCs. CSCs are a small sub-population of tumor cells that possess the ability to self-renew, differentiate, and form secondary or tertiary tumors. Conventional chemotherapy and radiotherapy are often ineffective against CSCs. Although current therapies effectively reduce tumor mass by destroying the bulk of cancer cells, they are unable to remove CSCs, which persist and generate new tumors, often of a far more aggressive nature. Therefore, in order to improve clinical outcomes, treatments must have the ability to kill the entirety of cancer cells, including CSCs. The osmium compound, described in Formula (I), wherein $X^1$, $X^2$, and $X^3$ were chloride ligands and the bidentate ligand was a 1,10-phenanthroline ligand, was able to kill breast cancer cells (HMLER) enriched with CSCs, 2.3-fold better than CSC-depleted breast cancer cells. Furthermore, the compound was able to inhibit the formation of breast CSC mammospheres to a similar extent as salinomycin, the most selective breast CSC-targeting compound identified to date. The selectivity of the osmium compound can be seen in Table 2 as well as FIGS. 17A-B and 18.

TABLE 2

$IC_{50}$ in micromolar and selectivity of anticancer agents for cancer stem cells.

| | HMLER CSC-depleted | HMLER$^{tax}$ CSC-enriched | HMLER$^{tax}$ selectivity |
|---|---|---|---|
| cisplatin | 1.95 | 2.06 | 0.95 |
| carboplatin | 17.84 | 18.19 | 0.98 |
| oxaliplatin | 15.04 | 26.95 | 0.55 |
| satraplatin | 1.22 | 2.87 | 0.43 |
| salinomycin | 0.49 | 0.058 | 8.45 |
| abamectin | 1.45 | 0.64 | 2.26 |
| OsN(phen)Cl$_3$ | 11.20 | 4.91 | 2.31 |

Example 4

This example describes the x-ray crystallographic study of an osmium compound. The crystal structure of 1H-4,7-diphenyl-1,10-phenanthrolinium chloride, dichloromethane solvate was investigated.

The initial solution of the structure by direct methods revealed the presence of two independent molecules in the asymmetric unit with the framework of 4,7-diphenyl-1,10-phenanthroline. Subsequent refinement cycles revealed the presence of a dichloromethane molecule as well as two chloride ions. A difference Fourier map obtained using a model including these atoms indicated that one nitrogen atom from each 4,7-diphenyl-1,10-phenanthroline was protonated. Protonation was also confirmed by differences between the two C—N—C angles within each molecule. This protonation allowed the structure to achieve charge neutrality. There was also a region containing disordered electron density that could not be successfully modelled. The total electron count within the void of 130 Å$^3$ corresponds to 43 e$^-$. This electron density, which could correspond to a dichloromethane molecule, could not be modelled, and so the SQUEEZE algorithm, implemented through PLATON, was used. Overall the molecule is similar in structure to the free base ligand.

Violet crystals of mer-[OsCl$_3$N(4,7-diphenyl-1,10-phenanthroline)], 4, were grown by vapor diffusion of diethyl ether into a DMF solution of the compound. A full dataset was acquired at 100 K and the observed intensities fit well to a C-centered monoclinic unit cell with no evidence of twinning. Integration and data reduction proceeded smoothly and the systematic absences for the c-glide plane were well obeyed. The value of $<E^2-1>=0.871$ is closer to 0.968, expected for centrosymmetric structures, than to 0.736, expected for non-centrosymmetric structures. The initial solution was therefore attempted in C2/c. Using either the heavy atom method or direct methods, a solution was obtained in which the general framework of the molecule could be established. The model, however, could not be refined anisotropically, had an anomalously long Os—N$_{nitride}$ bond, large R values, and a residual electron density of approximately 15 electrons within 1 Å of the Os atom. In the event that the large residual electron density results from a case of pseudosymmetry in which the osmium atoms from pseudocrystallographically related molecules, almost, but don't quite, overlap, attempts were made to solve the structure in a lower symmetry space group. These attempts were unsuccessful, however, and even solution in P1 showed high residual electron density near the Os. Note that absorption corrections were applied throughout.

The high residual electron density near the Os atom was assigned as a second Os atom and the occupancies of these two atoms were constrained to sum to unity. The Cl and $N_{niritdo}$ that are trans to the phenanthroline nitrogen atoms were modelled as disordered together with the osmium atom. These steps are shown diagrammatically in Scheme 2.
Scheme 2. Schematic depiction of the initial steps of the refinement of the whole molecule disorder.

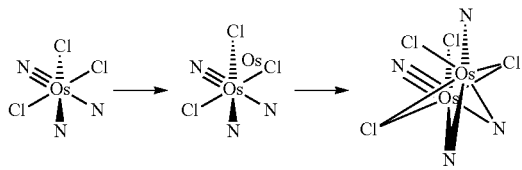

This model, however, did not reflect the significant trans influence of the nitrido ligand on the trans Os—$N_{phen}$ bond. The entire phenanthroline ligand was therefore included in the disorder. Finally, the trans chlorides do not subtend a 180° Cl—Os—Cl angle, but instead bow away from the nitride. The trans chlorides were included in the disorder as well, because the disorder of the nitride should cause the chlorides of the two disordered molecules to bow in different directions. The result of these steps is that the whole molecule is disordered. After refinement, one of the phenyl rings of the 4,7-diphenyl-1,10-phenanthroline had both components virtually overlapped, and so was removed from the disorder. The other ring showed significantly different orientations in the two components of the disorder.

In order to achieve a stable full-matrix least-squares refinement, restraints were introduced. The extensive use of restraints that will be described is merited by the extreme degree of disorder. The majority of the restraints merely restrain the bond lengths and angles of the two components of the disorder to be similar. The bonds restrained were those of the fused aromatic rings and those of Os to the metal-bound atoms of the ligands in the primary coordination sphere. The size and directionality of the thermal displacement parameters of adjacent atoms were restrained to be the same with a standard deviation of 0.02.

No higher symmetry or twinning was detected using PLATON. The most significant CheckCIF alerts (1 B-level and 3 C-level) was related to the thermal displacement parameters of the minor component of the disorder. There is also a C-level alert due to the low precision of the C—C bond distances. These were all believed to arise from the significant degree of disorder present in the structure.

In addition to the lack of twinning and missed symmetry, other factors played a role in the decision to describe the structure using whole molecule disorder. The disordered parts refined to have relative occupancies of 64:36. If the structure were better described as having a lower symmetry space group with more independent molecules in the asymmetric unit, then the occupancies of the parts might be close to 50:50 or 75:25, etc. The nitride and chloride ligands that are trans to the phenanthroline do not make any significant directional hydrogen bonds and their closest contacts are with the phenyl substituents of the 4,7-diphenyl-1,10-phenanthroline ligand of adjacent molecules. The most significant structural feature that would lock a particular orientation of the molecule in place is the significant difference in the Os—$N_{nitride}$ and Os—Cl bond lengths. With regard to the primary coordination sphere, the disorder could effectively be viewed as a reflection about the plane bisecting the N—Os—N angle of the phenanthroline ligand, which will also pass through the Cl—Os—$N_{nitride}$ angle.

The difference in the Os—$N_{nitride}$ and Os—Cl bond lengths was compensated by a shift in the osmium position Scheme 3. This shift also compensated for the difference in the bond lengths between the phenanthroline nitrogen atoms and the osmium, which are significantly different due to the trans influence of the nitride. Due to the significant disorder, which lowers the precision of bond length determinations, little emphasis will be placed on a detailed analysis of bond lengths and angles. A number of gross structural trends were evident; however, in both components of the disorder before any similarity restraints were applied. The crystal structure confirms that the chloride ligands are arranged in a meridional fashion. The remaining three coordination sites are occupied by the nitrido and 4,7-diphenyl-1,10-phenanthroline. The distance from the Os atom to the nitrido nitrogen is 1.645(17) Å, consistent with the presence of a triple bond between these atoms.[11] Other structural features of the complex are also similar to those demonstrated by previously characterized Os(VI) nitrido species. The nitrido ligand exerts a significant trans influence and, indeed, the bond to the 4,7-diphenyl-1,10-phenanthroline nitrogen atom that is trans to the nitrido is significantly longer, 2.307(17) Å, that than that which is trans to a chloride, 2.11(2) Å. Another feature of the structure is the bowing of the chlorides cis to the nitrido group away from this ligand. This deformation produces a Cl—Os—Cl bond angle of 161.2(5). Such deformations are well documented in complexes with metal-ligand multiple bonds and may arise from a combination of steric and rehybridization effects. Finally, the phenyl substituents on the phenanthroline are not coplanar with the rest of the ligand and the further degree of disorder in one of the rings attests to the rotational lability of these groups.

Scheme 3. Schematic representation of the disorder of 4.

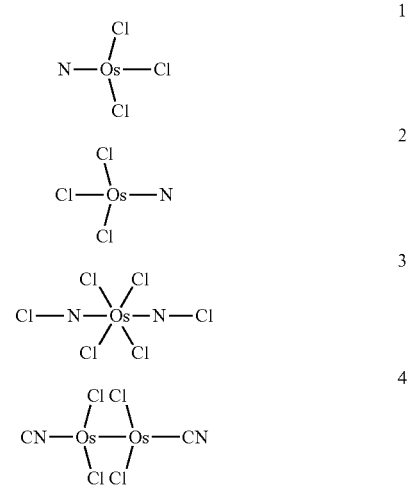

In Scheme 3: 1) Side-on view of the molecule. Note that the trans chlorides are in the plane of the page, the trans N and Cl are coming out of the page. Going into the page (not shown) are the two nitrogen atoms of the 4,7-diphenyl-1,10-phenanthroline ligand. 2) The molecule generated by action of a mirror plane perpendicular to the plane of the page and bisecting the Cl—Os—$N_{nitride}$ angle. 3) An overlay of parts 1 and 2 centered on the Os atom. Note that, owing to the difference in the Os—N and Os—Cl bond lengths, as well as the bowing of the trans chlorides away from the nitride, all exaggerated here, the disordered part occupies a different region of space. 4) If the Os center is translated then atoms within the primary coordination sphere are made to overlay.

Example 5

This example describes the materials and methods used in Examples 1-4.

Materials and Methods.

All synthetic procedures were performed under normal atmospheric conditions without exclusion of oxygen or moisture. Potassium osmate(VI) was purchased from Strem Chemicals and used as obtained. The bidentate aromatic ligands; 2,2'-bipyridine, 1,10-phenanthroline, 3,4,7,8-tetramethyl-1,10-phenanthroline and 4,7-diphenyl-1,10-phenanthroline were purchased from Sigma Aldrich and used as received. The syntheses of (NEt$_4$)[OsNCl$_4$], 1, 2 and 4 have been reported previously (see, e.g., Chin, K. F.; Cheung, K. K.; Yip, H. K.; Mak, T. C. W.; Che, C. M. J. Chem. Soc., Dalton Trans. 1995, 657-663; Griffith, W. P.; Pawson, D. J. Chem. Soc., Dalton Trans. 1973, 1315-1320; Wright, M. J.; Griffith, W. P. Transition Met. Chem. 1982, 7, 53-58), but the procedures reported here are novel. Analytical grade acetone and dichloromethane were used as solvents.

Physical Measurements.

NMR measurements were recorded on a Bruker 400 MHz spectrometer at 20° C. $^1$H and $^{13}$C{$^1$H} NMR spectra were referenced internally to residual solvent peaks, and chemical shifts are expressed relative to tetramethylsilane, SiMe$_4$ ($\delta$=0 ppm). Fourier transform infrared (FTIR) spectra were recorded with a ThermoNicolet Avatar 360 spectrophotometer upon preparation of the samples as KBr disks. The spectra were analysed using the OMNIC software. Graphite furnace atomic absorption spectrometry was carried out using a Perkin-Elmer AAnalyst600 GFAAS.

Synthesis of OsN(2,2'-bipyridine)Cl$_3$ (1)

(NEt$_4$)[OsNCl$_4$] (50 mg, 0.85 mmol) was dissolved in 2 mL of acetone. To this, a solution of 2,2'-bipyridine (40 mg, 2.55 mmol) in acetone (5 mL) was added in dropwise a manner. The combined solutions were stirred at room temperature for 24 h. The resultant precipitate was filtered and washed with warm acetone and diethyl ether. The osmium (VI) nitrido complex was isolated as a purple powder. Yield: 26 mg (33%). $^1$H NMR (400 MHz, DMSO-d$_6$): $\delta$ 9.19 (d, 1H), 9.04 (d, 1H), 8.74 (d, 1H), 8.57 (d, 1H), 8.48 (t, 1H), 8.37 (t, 1H), 7.96 (t, 1H), 7.75 (t, 1H). $^{13}$C NMR (400 MHz, DMSO-d$_6$): $\delta$ 157.0, 153.9, 149.2, 148.4, 144.70, 142.0, 129.7, 128.3, 126.3, 124.5. IR (KBr, cm$^{-1}$): 1086.0 (OsN). Anal. Calcd. for 1, C$_{10}$H$_8$N$_3$OsCl$_3$: C, 25.73; H, 1.73; N, 9.00. Found: C, 25.86; H, 1.30; N, 8.89.

Synthesis of OsN(1,10-phenanthroline)Cl$_3$ (2)

(NEt$_4$)[OsNCl$_4$] (50 mg, 0.85 mmol) was dissolved in 2 mL of acetone. To this, a solution of 1,10-phenanthroline (46 mg, 2.55 mmol) in acetone (5 mL) was added in a dropwise manner. The combined solutions were stirred at room temperature for 24 h. The resultant precipitate was filtered and washed with warm acetone and diethyl ether. The osmium (VI) nitrido complex was isolated as a purple powder. Yield: 30 mg (72%). $^1$H NMR (400 MHz, DMSO-d$_6$): $\delta$ 9.58 (d, 1H), 9.12 (d, 1H), 8.98 (d, 1H), 8.93 (d, 1H), 8.43 (s, 2H), 8.29 (dd, 1H), 8.11 (dd, 1H). $^{13}$C NMR (400 MHz, DMSO-d$_6$): $\delta$ 156.7, 149.1, 143.9, 143.7, 140.4, 140.4, 131.5, 130.5, 128.8, 128.4, 128.0, 127.2. IR (KBr, cm$^{-1}$): 1080.0 (OsN). Anal. Calcd. for 2, Cl$_2$H$_8$N$_3$OsCl$_3$: C, 29.37; H, 1.64; N, 8.56. Found: C, 30.20; H, 1.43; N, 8.27.

Synthesis of OsN(3,4,7,8-tetramethyl-1,10-phenanthroline)Cl$_3$ (3)

(NEt$_4$)[OsNCl$_4$] (50 mg, 0.85 mmol) was dissolved in 2 mL of acetone. To this, a solution of 3,4,7,8-tetramethyl-1,10-phenanthroline (60 mg, 2.55 mmol) in dichloromethane (5 mL) was added in a dropwise manner. The combined solutions were stirred at room temperature for 24 h. The resultant precipitate was filtered and washed with warm acetone, dichloromethane and diethyl ether. The osmium (VI) nitrido complex was isolated as a purple powder. Yield: 21 mg (46%). $^1$H NMR (400 MHz, DMSO-d$_6$): $\delta$ 9.31 (s, 1H), 8.61 (s, 1H), 8.49 (s, 2H), 3.12 (s, 3H), 2.78 (s, 3H), 2.65 (s, 3H), 2.56 (s, 3H). $^{13}$C NMR (400 MHz, DMSO-d$_6$): $\delta$ 155.8, 152.4, 148.7, 148.7, 142.4, 139.4, 136.8, 135.5, 129.8, 128.8, 125.1, 124.6, 17.8, 17.6, 15.4. IR (KBr, 1080.5 (OsN). Anal. Calcd. for 3, C$_{16}$H$_{16}$N$_3$OsCl$_3$: C, 35.14; H, 2.95; N, 7.68. Found: C, 34.78; H, 2.48; N, 7.42.

Synthesis of OsN(4,7-diphenyl-1,10-phenanthroline)Cl$_3$ (4)

(NEt$_4$)[OsNCl$_4$] (50 mg, 0.85 mmol) was dissolved in 2 mL of acetone. To this, a solution of 4,7-diphenyl-1,10-phenanthroline (85 mg, 2.55 mmol) in dichloromethane (5 mL) was added in a dropwise manner. The combined solutions were stirred at room temperature for 24 h. The resultant precipitate was filtered and washed with warm acetone, dichloromethane and diethyl ether. The osmium (VI) nitrido complex was isolated as a purple powder. Yield: 15 mg (27%). $^1$H NMR (400 MHz, DMSO-d$_6$): $\delta$ 9.63 (d, 1H), 8.99 (d, 1H), 8.24 (m, 3H), 8.09 (d, 1H), 7.85 (m, 2H), 7.70 (m, 8H). $^{13}$C NMR (400 MHz, DMSO-d$_6$): $\delta$ 156.2, 154.9, 151.7, 148.8, 144.5, 141.3, 135.5, 134.7, 134.2, 130.8, 130.5, 130.3, 129.7, 129.7, 129.2, 128.1, 128.1, 127.4, 126.7, 126.4. IR (KBr, 1080.5 (OsN). Anal. Calcd. for 3, C$_{24}$H$_{16}$N$_3$OsCl$_3$: C, 44.83; H, 2.51; N, 6.54. Found: C, 44.51; H, 2.27; N, 6.32.

X-Ray Crystallography.

Crystals of mer-[OsCl$_3$N(4,7-diphenyl-1,10-phenanthroline)], 4, were grown at room temperature by vapor diffusion of diethyl ether into a DMF solution of the complex. Crystals of 4,7-diphenyl-1,10-phenanthroline chloride were obtained as a minor side product during an attempt to induce crystallization from a dichloromethane reaction mixture containing this material. Suitable crystals were selected by microscopic examination through crossed polarizers, mounted on a nylon cryoloop in Paratone oil, and cooled to 100 K under a stream of nitrogen. A Bruker APEX CCD X-ray diffractometer controlled by the APEX2 software was used to collect the diffraction of graphite-monochromated Mo K$\alpha$ radiation ($\lambda$=0.71073 Å) from the crystal. The data were integrated with SAINT and absorption, Lorentz, and polarization corrections were calculated by SADABS. Space group determination and structure solution and refinement were carried out with XPREP and the SHELXTL-97 software package, respectively (vide infra). All non-hydrogen atoms were refined anisotropically. Hydrogen atoms were placed at calculated positions and refined using a riding model with their isotropic displacement parameters ($U_{iso}$) set to 1.2 $U_{iso}$ of the atom to which they were attached. The positions of the hydrogen atoms bound to the nitrogen atoms in the structure of 1H-4,7-diphenyl-1,10-phenanthrolinium chloride were refined semi-freely. The structures, which were deposited in the Cambridge Structural Database, were checked for missed higher symmetry and twinning with PLATON and were further validated using CheckCIF.

Cell Lines and Cell Culture Conditions.

A549 lung adenocarcinoma, HeLa cervical cancer, and MRC5 normal human fetal lung fibroblast cell lines were maintained in Dulbecco's Modified Eagle's Medium (DMEM-low glucose) supplemented with 10% fetal bovine serum and 1% penicillin/streptomycin. The cisplatin-sensitive A2780 ovarian cancer and the cisplatin-resistant A2780/CP70 ovarian cancer cell lines were cultured in RPMI (glutamine free) media supplemented with 10% fetal bovine serum and 1% penicillin/streptomycin. All cells were grown at 310 K in a humidified atmosphere containing 5% $CO_2$.

Cytotoxicity MTT Assay.

The colorimetric MTT assay was used to determine the toxicity of the osmium complexes and cisplatin. Cells ($2 \times 10^3$) were seeded in each well of a 96-well plate. After incubating the cells overnight, various concentrations of test compound (0.3-100 μM) were added and incubated for 72 h (total volume 200 μL). The test compounds were prepared as 10 mM solutions in DMSO and diluted using media. The final concentration of DMSO in each well was 0.5% and this amount was present in the untreated control as well. Cisplatin was prepared as a 5 mM solution in PBS and diluted further using media. After 72 h, the medium was removed, 200 μL of a 0.4 mg/mL solution of MTT in DMEM or RPMI was added, and the plate was incubated for an additional 1-2 h. The DMEM/MTT or RPMI/MTT mixture was aspirated and 200 μL of DMSO was added to dissolve the resulting purple formazan crystals. The absorbance of the solution wells was read at 550 nm. Absorbance values were normalized to DMSO-containing control wells and plotted as concentration of test compound versus % cell viability. $IC_{50}$ values were interpolated from the resulting dose dependent curves. The reported $IC_{50}$ values are the average from at least three independent experiments, each of which consisted of six replicates per concentration level.

For specific pathway and cell death inhibitor assays, inhibitors of p53 (pifithrin-α, 10 μM and pifithrin-μ, 10 μM), ER stress (salubrinal, 10 μM), necrosis (IM-54, 10 μM), and autophagocytosis (chloroquine, 10 μM) were added to cells and incubated for 0-1 h prior to treatment with the test compounds.

Gel Electrophoresis.

Plasmid DNA (pUC19) was kindly donated. The DNA binding ability of the osmium complexes was determined by monitoring the conversion of supercoiled plasmid DNA (form I) to nicked circular DNA (form II) using agarose gel electrophoresis. To probe the effect of Os-complex concentration, solutions containing 55 μg of DNA and 0, 10, 20, 50, 100, 250, 500, and 1000 μM of the osmium complexes with a total reaction volume of 15 μL were incubated at 37° C. for 24 h. After this time period, loading buffer (5 μL, containing 0.25% bromophenol blue, 0.25% xylene cyanol and 60% glycerol) was added and the reaction mixtures were immediately loaded onto 1% agarose gels. The DNA fragments were separated by applying 80 V for 1.5 h. Tris-acetate EDTA (TAE) was used as the running buffer. The gels were stained in TAE solution containing ethidium bromide (1.0 μg $mL^{-1}$) for 4 h. The DNA bands were analysed under UV light using a Flor-S reader (BioRad).

DNA Binding Kinetics.

The amount of osmium covalently bound to ct-DNA was determined by modification of a previously reported protocol. A solution of ct-DNA (0.25 mM, nucleotide) was incubated with 2 or 4 at a bp:metal complex ratio of 5:1 at 37° C. in 1 mM sodium phosphate buffer, pH 7.4, containing 3 mM NaCl. At certain time points, a 250 μL aliquot was removed and the DNA was precipitated by adding 10 μL of NaCl (5 M) and 1.0 mL of EtOH (stored at 4° C.). The solution was centrifuged to remove DNA, and the concentration of unbound osmium was determined by GF-AAS.

RNAi Signatures.

Compounds were dosed to achieve an LD80-90 in Eμ-Myc$^{p19arf-/-}$ cells by propidium iodide exclusion as determined by FACS after a 48 h incubation. GFP enrichment/depletion was then determined by FACS at 72 h. Linkage ratios (LR) and p-values were generated as described previously (see, e.g., Jiang, H.; Pritchard, J. R.; Williams, R. T.; Lauffenburger, D. A.; Hemann, M. T. Nat. Chem. Biol. 2011, 7, 92-100; Pritchard, J. R.; Bruno, P. M.; Gilbert, L. A.; Capron, K. L.; Lauffenburger, D. A.; Hemann, M. T. Proc. Natl. Acad. Sci. U.S.A 2013, 110, E170-179; Pritchard, J. R.; Bruno, P. M.; Hemann, M. T.; Lauffenburger, D. A. Mol. BioSyst. 2013, 9, 1604-1619). All FACS was conducted using a FACScan (BD Biosciences).

GFP Competition Assays.

Eμ-Myc$^{p19arf-/-}$ lymphoma or p185+ BCR-Abl$^{p19arf-/-}$ leukemia cells were infected with GFP-tagged shRNAs such that 15-25% of the population were GFP positive. An eighth of a million cells in 250 μL B-cell media (BCM) were then seeded into 24-well plates. For wells that would remain untreated as a control, only 1/16th of a million cells were seeded. Next, 250 μL of media containing the active agent was added to the cells. After 24 h, 300 μL of cells from untreated wells are removed and replaced by 300 μL fresh BCM. All wells then received 500 μL BCM before being placed by in the incubator for another 24 h. At 48 h, cells transduced with the control vector, MLS, were checked for viability via FACS on a FACScan (BD Biosciences) using propidium iodide as a live/dead marker. Untreated wells then had 700 μL of cells removed and replaced with 700 μL fresh media followed by a further 1 mL of fresh media. Wells for which the compound had killed 80-90% of cells (LD80-90) were then diluted further by adding 1 mL of BCM. Finally, at 72 h, all wells for which an LD80-90 was achieved, as well as the untreated samples, were analyzed via FACS to determine GFP % enrichment.

Immunoblotting Analysis.

A2780 cells ($5 \times 10^5$ cells) were incubated with the osmium complexes (concentrations, μM) for 72 h at 37° C. Cells were washed with PBS, scraped into SDS-PAGE loading buffer (64 mM Tris-HCl (pH6.8)/9.6% glycerol/2% SDS/5% β-mercaptoethanol/0.01% Bromophenol Blue), and incubated at 95° C. for 10 min. Whole cell lysates were resolved by 4-20% sodium dodecylsulphate polyacylamide gel electrophoresis (SDS-PAGE; 200 V for 25 min) followed by electro transfer to polyvinylidene difluoride membrane, PVDF (350 mA for 1 h). Membranes were blocked in 5% (w/v) non-fat milk in PBST (PBS/0.1% Tween 20) and incubated with the appropriate primary antibodies (Cell Signalling Technology and Santa Cruz). After incubation with horseradish peroxidase-conjugated secondary antibodies (Cell Signalling Technology), immune complexes were detected with the ECL detection reagent (BioRad) and analyzed using an Alpha Innotech ChemiImager™ 5500 fitted with a chemiluminescence filter.

Cellular Uptake.

To measure the cellular uptake of the osmium complexes, ca. 1 million A2780 cells were treated with 10 μM of the complexes at 37° C. for 12 h. Then the media was removed, the cells were washed with PBS solution (1 mL×3), harvested, and centrifuged. The cellular pellet was suspended in an appropriate volume of PBS to obtain a homogeneous cell suspension (eg. 100 µL). The Thermo Scientific NE-PER Nuclear and Cytoplasmic Extraction Kit was used to extract the separate cytoplasmic, nuclear, and membrane fractions. The fractions were mineralized with 65% $HNO_3$ and then completely dried at 120° C. The solid extracts were re-dissolved in 4% $HNO_3$ and analysed using graphite furnace-atomic absorption spectroscopy (GF-AAS). Cellular osmium levels were expressed as ppb Os per million cells. Results are presented as the mean of 3 determinations for each data point.

Intracellular DNA Osmium Content.

To measure the amount osmium on genomic DNA, ca. 1 million A2780 cells were treated with 10 µM of the complexes at 37° C. for 12 h. Then the media were removed, the cells were washed with PBS solution (1 mL×3), harvested, and centrifuged. The cellular pellet was suspended in DNA-zol (1 mL, genomic DNA isolation reagent, MRC). The DNA was precipitated with ethanol (0.5 mL), washed with 75% ethanol (0.75 mL×3), and re-dissolved in 200 µL of 8 mM NaOH. The DNA concentration was determined by UV-visible spectroscopy, and osmium was quantified by GFAAS. The reported values are the average of at least three independent experiments with the error reported as the standard deviation.

Fluorescence Microscopy.

A2780 cells ($1×10^4$) were incubated with and without 4 (10 µM) for 6 h. The media was then removed and the cells were washed with additional media (2 mL×2). After incubation of the cells with more media containing ER tracker Blue (10 µL), the ER region was imaged using a fluorescent microscope (emission between 430 and 640 nm). Fluorescence imaging experiments were performed using a Zeiss Axiovert 200M inverted epifluorscence microscope with a Hamamatsu EM-CCD digital camera C9100 and a MS200 XY Piezo Z stage (Applied Scientific Instruments, Inc.). An X-Cite 120 metal halide lamp (EXFO) was used as the light source. Zeiss standard filter sets 49, 38 HE, and 43 HE were employed for imaging the ER-Tracker sensor. The microscope was operated with Volocity software (version 6.01, Improvision). The exposure time for acquisition of fluorescence images was kept constant for each series of images at each channel. The ER and whole cell size was quantified using ImageJ (version 1.45, NIH). The size of the whole cell was measured by tracing the outline of the cell membrane in the DIC view. The size of the ER was measured by tracing the outline of emission observed from ER tracker Blue in the DAPI (blue) channel. The reported values are the average of three measurements with the error reported as the standard deviation.

Flow Cytometry Studies.

In order to monitor the cell cycle, flow cytometry studies were carried out. A2780 cells were incubated with and without the test compounds for 24-72 h at 37° C. Studies on A549 cells under normal and starved (proliferating and non-proliferating) conditions were also carried out. Cells were harvested from adherent cultures by trypsinization. Following centrifugation at 1000 rpm for 5 min, cells were washed with PBS and then fixed with 70% ethanol in PBS. Fixed cells were collected by centrifugation at 2500 rpm for 3 min, washed with PBS and centrifuged as before. Cellular pellets were re-suspended in 50 µg/ml propidium iodide (Sigma) in PBS for nucleic acids staining and treated with 100 µg/ml RNaseA (Sigma). DNA content was measured on a FACSCalibur-HTS flow cytometer (BD Biosciences) using laser excitation at 488 nm and 20,000 events per sample were acquired. Cell cycle profiles were analysed using the ModFit software. For the apoptosis experiments, the Annexin V-FITC Early Apoptosis Detection Kit was used. The manufacture's protocol was followed to carry out this experiment. Briefly, untreated and treated cells ($1×10^5$) were suspended in 1× annexin binding buffer (96 µL) (10 mM HEPES, 140 mM NaCl, 2.5 mM $CaCl_2$), pH 7.4), then 1 µL FITC annexin V and 12.5 µL PI (10 µg/mL) were added to each sample and incubated on ice for 15 min. After which more binding buffer (150 µL) was added while gently mixing. The samples were kept on ice prior to being read on the FACSCalibur-HTS flow cytometer (BD Biosciences) and 20,000 events per sample were acquired. Cell populations were analysed using the FlowJo software (Tree Star).

Mammosphere Formation Assay.

HMLER cells (3×104) cells were plated in ultralow attachment plates (Corning). Cells were treated with cisplatin, carboplatin, oxaliplatin, satraplatin, OsN(phen)$Cl_2$, and salinomycin (at their $IC_{50}$ values) and incubated for 5 days (37° C., 5% $CO_2$. Taxol (15 nM) treated cells were used as positive controls. After incubation, the mammoshpheres were counted.

Measurement of Water-Octanol Partition Coefficient (Log P).

The log P values were obtained using the shake-flask method and graphite furnace atomic absorption spectroscopy (GF-AAS). Octanol used in this experiment was pre-saturated with water by overnight incubation with shaking of a biphasic mixture of the two at room temperature. A portion of 0.5 mL water containing 50 µM of the given compound was incubated with the pre-saturated octanol (0.5 mL) in a 1.5 mL tube. The tube was shaken at room temperature for 3 h. The two phases were separated by centrifugation and the osmium content (concentration) in each phase was determined by GFAAS. All the experiments were carried out in triplicate. The log P was then calculated using the formula below:

$$\text{Log } P = \log 10[(\text{conc. of osmium in the octanol layer})/(\text{conc. of osmium in the water layer})].$$

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A composition comprising a compound of Formula I:

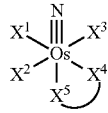

(I)

wherein:

X$^1$, X$^2$, and X$^3$ are the same or different and are selected from the group consisting of halo, —CN, —OR', —OCN, —SeCN, —SR', —SCN, —OCOR', —OSO$_2$, and —OPO$_3$R'$_2$;

each R' is independently hydrogen, optionally substituted alkyl, optionally substituted heteroalkyl, optionally substituted aryl, or optionally substituted heteroaryl; and

X$^4$⌢X$^5$ is a bidentate ligand comprising the structure:

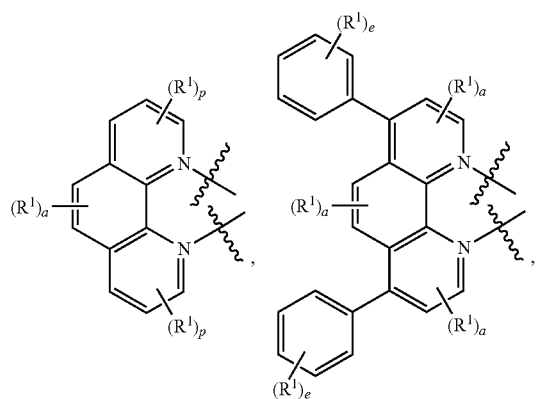

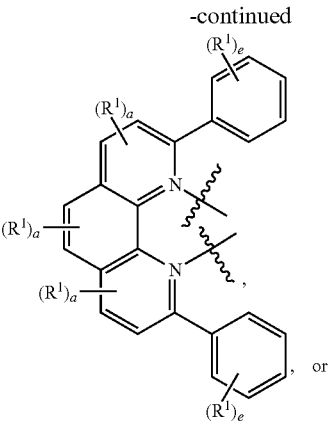

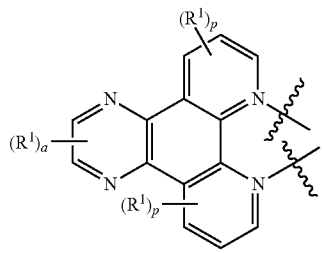

wherein:

each R$^1$ is independently —CN, —OR$^3$, —SR$^3$, —COOR$^3$, —OCOR$^3$, —N(R$^3$)$_2$, —NO$_2$, halo, optionally substituted alkyl, optionally substituted heteroalkyl, optionally substituted cycloheteroalkyl, optionally substituted alkenyl, optionally substituted alkynyl, optionally substituted aryl, or optionally substituted heteroaryl, or optionally any two R$^1$ may be joined to form a ring;

each R$^3$ is independently hydrogen, optionally substituted alkyl, optionally substituted heteroalkyl, optionally substituted aryl, or optionally substituted heteroaryl;

each e is independently 0, 1, 2, 3, 4, or 5;

each p is independently 0, 1, 2, or 3; and each a is independently 0, 1, or 2 wherein at least one R$^1$ is substituted with -Q, wherein -Q is a targeting moiety.

2. The composition of claim 1, wherein

comprises the structure:

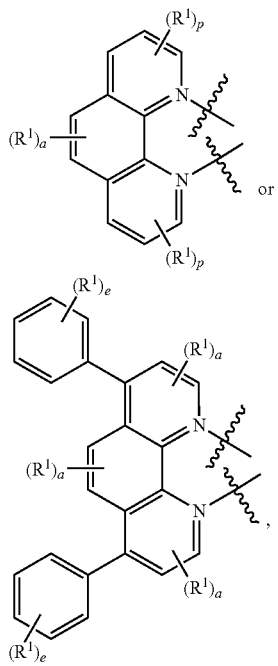

wherein:
  each R¹ is independently —CN, —OR³, —SR³, —COOR³, —OCOR³, —N(R³)₂, —NO₂, halo, optionally substituted alkyl, optionally substituted heteroalkyl, optionally substituted cycloheteroalkyl, optionally substituted alkenyl, optionally substituted alkynyl, optionally substituted aryl, or optionally substituted heteroaryl, or optionally any two R¹ may be joined to form a ring;
  each R³ is independently hydrogen, optionally substituted alkyl, optionally substituted heteroalkyl, optionally substituted aryl, or optionally substituted heteroaryl;
  each e is independently 0, 1, 2, 3, 4, or 5;
  each p is independently 0, 1, 2, or 3; and
  each a is independently 0, 1, or 2.

3. The composition of claim 1, wherein at least one R¹ is substituted with -L-Q, wherein L is a linking moiety and Q is a targeting moiety.

4. The composition of claim 1, wherein $$X^4 \frown X$$

comprises the structure:

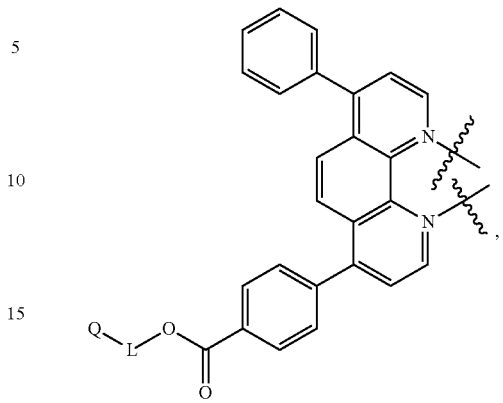

wherein L is a linking moiety and Q is a targeting moiety.

5. The composition of claim 1, wherein X¹, X², and X³ are halo.

6. The composition of claim 1, wherein X¹, X², and X³ are chloro.

7. The composition of claim 1, wherein R' is optionally substituted alkyl or optionally substituted aryl.

8. The composition of claim 4, wherein L is three hydrophobic amino acids, each independently selected from the group consisting of alanine, valine, isoleucine phenylalanine, tryptophan, and tyrosine.

9. The composition of claim 4, wherein Q is a peptide.

10. The composition of claim 1, wherein the compound causes at least a two-fold increase in cell death in a cancer cell compared to a non-cancer cell.

11. The composition of claim 1, wherein the compound causes at least a two-fold increase in cell death in cancer stem cells compared to non-cancer cells.

12. The composition of claim 1, wherein the compound causes at least a two-fold increase in cell death in cancer stem cells compared to cancer cells.

13. A pharmaceutical composition, comprising:
  the compound of claim 1, or a pharmaceutically acceptable salt thereof; and
  one or more pharmaceutically acceptable carriers, additives, and/or diluents.

14. A kit for the treatment of cancer, comprising:
  the composition of claim 1; and
  instructions for use of the composition for treatment of cancer.

15. A method of treating cancer in a patient in need of treatment for cancer, comprising:
  administering the composition of claim 1 to the patient.

16. The composition of claim 1, wherein the compound has a log P greater than or equal to about 1.7.

* * * * *